United States Patent
Tang

(10) Patent No.: US 9,898,459 B2
(45) Date of Patent: Feb. 20, 2018

(54) INTEGRATION OF DOMAIN INFORMATION INTO STATE TRANSITIONS OF A FINITE STATE TRANSDUCER FOR NATURAL LANGUAGE PROCESSING

(71) Applicant: VOICEBOX TECHNOLOGIES CORPORATION, Bellevue, WA (US)

(72) Inventor: Min Tang, Bellevue, WA (US)

(73) Assignee: VoiceBox Technologies Corporation, Bellevue, WA (US)

(*) Notice: Subject to any disclaimer, the term of this patent is extended or adjusted under 35 U.S.C. 154(b) by 0 days.

(21) Appl. No.: 14/855,346

(22) Filed: Sep. 15, 2015

(65) Prior Publication Data
US 2016/0188573 A1    Jun. 30, 2016

Related U.S. Application Data

(60) Provisional application No. 62/051,292, filed on Sep. 16, 2014.

(51) Int. Cl.
| | |
|---|---|
| *G06F 17/27* | (2006.01) |
| *G06F 17/28* | (2006.01) |
| *G10L 15/18* | (2013.01) |
| G06F 17/20 | (2006.01) |
| G06F 17/30 | (2006.01) |
| G10L 15/00 | (2013.01) |
| G10L 15/02 | (2006.01) |

(52) U.S. Cl.
CPC ............ *G06F 17/28* (2013.01); *G06F 17/277* (2013.01); *G06F 17/2775* (2013.01);
(Continued)

(58) Field of Classification Search
USPC ............................ 704/9, 10, 251, 4; 707/899
See application file for complete search history.

(56) References Cited

U.S. PATENT DOCUMENTS

| | | |
|---|---|---|
| 4,430,669 A | 2/1984 | Cheung |
| 4,821,027 A | 4/1989 | Mallory |
| | (Continued) | |

FOREIGN PATENT DOCUMENTS

| | | |
|---|---|---|
| CN | 1433554 A | 7/2003 |
| CN | 1860496 A | 11/2006 |
| | (Continued) | |

OTHER PUBLICATIONS

"Statement in Accordance with the Notice from the European Patent Office" dated Oct. 1, 2007 Concerning Business Methods (OJ EPO Nov. 2007, 592-593), XP002456252.
(Continued)

*Primary Examiner* — Neeraj Sharma
(74) *Attorney, Agent, or Firm* — Sheppard Mulin Richter & Hampton LLP

(57) ABSTRACT

The invention relates to a system and method for integrating domain information into state transitions of a Finite State Transducer ("FST") for natural language processing. A system may integrate semantic parsing and information retrieval from an information domain to generate an FST parser that represents the information domain. The FST parser may include a plurality of FST paths, at least one of which may be used to generate a meaning representation from a natural language input. As such, the system may perform domain-based semantic parsing of a natural language input, generating more robust meaning representations using domain information. The system may be applied to a wide range of natural language applications that use natural language input from a user such as, for example, natural language interfaces to computing systems, communication with robots in natural language, personalized digital assistants, question-answer query systems, and/or other natural language processing applications.

25 Claims, 22 Drawing Sheets

(52) U.S. Cl.
CPC ...... *G06F 17/2785* (2013.01); *G10L 15/1815* (2013.01); *G10L 2015/025* (2013.01)

(56) References Cited

U.S. PATENT DOCUMENTS

| | | | |
|---|---|---|---|
| 4,829,423 A | 5/1989 | Tennant | |
| 4,887,212 A | 12/1989 | Zamora | |
| 4,910,784 A | 3/1990 | Doddington | |
| 5,027,406 A | 6/1991 | Roberts | |
| 5,155,743 A | 10/1992 | Jacobs | |
| 5,164,904 A | 11/1992 | Sumner | |
| 5,208,748 A | 5/1993 | Flores | |
| 5,265,065 A | 11/1993 | Turtle | |
| 5,274,560 A | 12/1993 | LaRue | |
| 5,331,554 A | 7/1994 | Graham | |
| 5,357,596 A | 10/1994 | Takebayashi | |
| 5,369,575 A | 11/1994 | Lamberti | |
| 5,377,350 A | 12/1994 | Skinner | |
| 5,386,556 A | 1/1995 | Hedin | |
| 5,424,947 A | 6/1995 | Nagao | |
| 5,471,318 A | 11/1995 | Ahuja | |
| 5,475,733 A | 12/1995 | Eisdorfer | |
| 5,479,563 A | 12/1995 | Yamaguchi | |
| 5,488,652 A | 1/1996 | Bielby | |
| 5,499,289 A | 3/1996 | Bruno | |
| 5,500,920 A | 3/1996 | Kupiec | |
| 5,517,560 A | 5/1996 | Greenspan | |
| 5,533,108 A | 7/1996 | Harris | |
| 5,537,436 A | 7/1996 | Bottoms | |
| 5,539,744 A | 7/1996 | Chu | |
| 5,557,667 A | 9/1996 | Bruno | |
| 5,559,864 A | 9/1996 | Kennedy, Jr. | |
| 5,563,937 A | 10/1996 | Bruno | |
| 5,577,165 A | 11/1996 | Takebayashi | |
| 5,590,039 A | 12/1996 | Ikeda | |
| 5,608,635 A | 3/1997 | Tamai | |
| 5,615,296 A | 3/1997 | Stanford | |
| 5,617,407 A | 4/1997 | Bareis | |
| 5,633,922 A | 5/1997 | August | |
| 5,634,086 A | 5/1997 | Rtischev | |
| 5,652,570 A | 7/1997 | Lepkofker | |
| 5,675,629 A | 10/1997 | Raffel | |
| 5,696,965 A | 12/1997 | Dedrick | |
| 5,708,422 A | 1/1998 | Blonder | |
| 5,721,938 A | 2/1998 | Stuckey | |
| 5,722,084 A | 2/1998 | Chakrin | |
| 5,740,256 A | 4/1998 | CastelloDaCosta | |
| 5,742,763 A | 4/1998 | Jones | |
| 5,748,841 A | 5/1998 | Morin | |
| 5,748,974 A | 5/1998 | Johnson | |
| 5,752,052 A | 5/1998 | Richardson | |
| 5,754,784 A | 5/1998 | Garland | |
| 5,761,631 A | 6/1998 | Nasukawa | |
| 5,774,841 A | 6/1998 | Salazar | |
| 5,774,859 A | 6/1998 | Houser | |
| 5,794,050 A | 8/1998 | Dahlgren | |
| 5,794,196 A | 8/1998 | Yegnanarayanan | |
| 5,797,112 A | 8/1998 | Komatsu | |
| 5,799,276 A | 8/1998 | Komissarchik | |
| 5,802,510 A | 9/1998 | Jones | |
| 5,829,000 A | 10/1998 | Huang | |
| 5,832,221 A | 11/1998 | Jones | |
| 5,839,107 A | 11/1998 | Gupta | |
| 5,848,396 A | 12/1998 | Gerace | |
| 5,855,000 A | 12/1998 | Waibel | |
| 5,867,817 A | 2/1999 | Catallo | |
| 5,878,385 A | 3/1999 | Bralich | |
| 5,878,386 A | 3/1999 | Coughlin | |
| 5,892,813 A | 4/1999 | Morin | |
| 5,892,900 A | 4/1999 | Ginter | |
| 5,895,464 A | 4/1999 | Bhandari | |
| 5,895,466 A | 4/1999 | Goldberg | |
| 5,897,613 A | 4/1999 | Chan | |
| 5,899,991 A | 5/1999 | Karch | |
| 5,902,347 A | 5/1999 | Backman | |
| 5,911,120 A | 6/1999 | Jarett | |
| 5,918,222 A | 6/1999 | Fukui | |
| 5,926,784 A | 7/1999 | Richardson | |
| 5,933,822 A | 8/1999 | Braden-Harder | |
| 5,950,167 A | 9/1999 | Yaker | |
| 5,953,393 A | 9/1999 | Culbreth | |
| 5,960,384 A * | 9/1999 | Brash | G06F 17/2705 704/10 |
| 5,960,397 A | 9/1999 | Rahim | |
| 5,960,399 A | 9/1999 | Barclay | |
| 5,960,447 A | 9/1999 | Holt | |
| 5,963,894 A | 10/1999 | Richardson | |
| 5,963,940 A | 10/1999 | Liddy | |
| 5,983,190 A | 11/1999 | Trower, II | |
| 5,987,404 A | 11/1999 | DellaPietra | |
| 5,991,721 A | 11/1999 | Asano | |
| 5,995,119 A | 11/1999 | Cosatto | |
| 5,995,928 A | 11/1999 | Nguyen | |
| 5,995,943 A | 11/1999 | Bull | |
| 6,009,382 A | 12/1999 | Martino | |
| 6,014,559 A | 1/2000 | Amin | |
| 6,018,708 A | 1/2000 | Dahan | |
| 6,021,384 A | 2/2000 | Gorin | |
| 6,028,514 A | 2/2000 | Lemelson | |
| 6,035,267 A | 3/2000 | Watanabe | |
| 6,044,347 A | 3/2000 | Abella | |
| 6,049,602 A | 4/2000 | Foladare | |
| 6,049,607 A | 4/2000 | Marash | |
| 6,058,187 A | 5/2000 | Chen | |
| 6,067,513 A | 5/2000 | Ishimitsu | |
| 6,073,098 A | 6/2000 | Buchsbaum | |
| 6,076,059 A | 6/2000 | Glickman | |
| 6,078,886 A | 6/2000 | Dragosh | |
| 6,081,774 A | 6/2000 | deHita | |
| 6,085,186 A | 7/2000 | Christianson | |
| 6,101,241 A | 8/2000 | Boyce | |
| 6,108,631 A | 8/2000 | Ruhl | |
| 6,119,087 A | 9/2000 | Kuhn | |
| 6,119,101 A | 9/2000 | Peckover | |
| 6,122,613 A | 9/2000 | Baker | |
| 6,134,235 A | 10/2000 | Goldman | |
| 6,144,667 A | 11/2000 | Doshi | |
| 6,144,938 A | 11/2000 | Surace | |
| 6,154,526 A | 11/2000 | Dahlke | |
| 6,160,883 A | 12/2000 | Jackson | |
| 6,167,377 A | 12/2000 | Gillick | |
| 6,173,266 B1 | 1/2001 | Marx | |
| 6,173,279 B1 | 1/2001 | Levin | |
| 6,175,858 B1 | 1/2001 | Bulfer | |
| 6,185,535 B1 | 2/2001 | Hedin | |
| 6,188,982 B1 | 2/2001 | Chiang | |
| 6,192,110 B1 | 2/2001 | Abella | |
| 6,192,338 B1 | 2/2001 | Haszto | |
| 6,195,634 B1 | 2/2001 | Dudemaine | |
| 6,195,651 B1 | 2/2001 | Handel | |
| 6,199,043 B1 | 3/2001 | Happ | |
| 6,208,964 B1 | 3/2001 | Sabourin | |
| 6,208,972 B1 | 3/2001 | Grant | |
| 6,219,346 B1 | 4/2001 | Maxemchuk | |
| 6,219,643 B1 | 4/2001 | Cohen | |
| 6,219,645 B1 | 4/2001 | Byers | |
| 6,226,612 B1 | 5/2001 | Srenger | |
| 6,233,556 B1 | 5/2001 | Teunen | |
| 6,233,559 B1 | 5/2001 | Balakrishnan | |
| 6,233,561 B1 | 5/2001 | Junqua | |
| 6,236,968 B1 | 5/2001 | Kanevsky | |
| 6,243,679 B1 * | 6/2001 | Mohri | G10L 15/193 704/10 |
| 6,246,981 B1 | 6/2001 | Papineni | |
| 6,246,990 B1 | 6/2001 | Happ | |
| 6,266,636 B1 | 7/2001 | Kosaka | |
| 6,269,336 B1 | 7/2001 | Ladd | |
| 6,272,455 B1 | 8/2001 | Hoshen | |
| 6,272,461 B1 | 8/2001 | Meredith | |
| 6,275,231 B1 | 8/2001 | Obradovich | |
| 6,278,377 B1 | 8/2001 | DeLine | |
| 6,278,968 B1 | 8/2001 | Franz | |
| 6,286,002 B1 | 9/2001 | Axaopoulos | |
| 6,288,319 B1 | 9/2001 | Catona | |

(56) References Cited

U.S. PATENT DOCUMENTS

| | | |
|---|---|---|
| 6,292,767 B1 | 9/2001 | Jackson |
| 6,301,560 B1 | 10/2001 | Masters |
| 6,308,151 B1 | 10/2001 | Smith |
| 6,311,159 B1 | 10/2001 | VanTichelen |
| 6,314,402 B1 | 11/2001 | Monaco |
| 6,321,196 B1 | 11/2001 | Franceschi |
| 6,356,869 B1 | 3/2002 | Chapados |
| 6,362,748 B1 | 3/2002 | Huang |
| 6,366,882 B1 | 4/2002 | Bijl |
| 6,366,886 B1 | 4/2002 | Dragosh |
| 6,374,214 B1 | 4/2002 | Friedland |
| 6,374,226 B1 | 4/2002 | Hunt |
| 6,377,913 B1 | 4/2002 | Coffman |
| 6,381,535 B1 | 4/2002 | Durocher |
| 6,385,596 B1 | 5/2002 | Wiser |
| 6,385,646 B1 | 5/2002 | Brown |
| 6,389,398 B1 | 5/2002 | Lustgarten |
| 6,393,403 B1 | 5/2002 | Majaniemi |
| 6,393,428 B1 | 5/2002 | Miller |
| 6,397,181 B1 | 5/2002 | Li |
| 6,404,878 B1 | 6/2002 | Jackson |
| 6,405,170 B1 | 6/2002 | Phillips |
| 6,408,272 B1 | 6/2002 | White |
| 6,411,810 B1 | 6/2002 | Maxemchuk |
| 6,411,893 B2 | 6/2002 | Ruhl |
| 6,415,257 B1 | 7/2002 | Junqua |
| 6,418,210 B1 | 7/2002 | Sayko |
| 6,420,975 B1 | 7/2002 | DeLine |
| 6,429,813 B2 | 8/2002 | Feigen |
| 6,430,285 B1 | 8/2002 | Bauer |
| 6,430,531 B1 | 8/2002 | Polish |
| 6,434,523 B1 | 8/2002 | Monaco |
| 6,434,524 B1 | 8/2002 | Weber |
| 6,434,529 B1 | 8/2002 | Walker |
| 6,442,522 B1 | 8/2002 | Carberry |
| 6,446,114 B1 | 9/2002 | Bulfer |
| 6,453,153 B1 | 9/2002 | Bowker |
| 6,453,292 B2 | 9/2002 | Ramaswamy |
| 6,456,711 B1 | 9/2002 | Cheung |
| 6,456,974 B1 | 9/2002 | Baker |
| 6,466,654 B1 | 10/2002 | Cooper |
| 6,466,899 B1 | 10/2002 | Yano |
| 6,470,315 B1 | 10/2002 | Netsch |
| 6,487,494 B2 | 11/2002 | Odinak |
| 6,487,495 B1 | 11/2002 | Gale |
| 6,498,797 B1 | 12/2002 | Anerousis |
| 6,499,013 B1 | 12/2002 | Weber |
| 6,501,833 B2 | 12/2002 | Phillips |
| 6,501,834 B1 | 12/2002 | Milewski |
| 6,505,155 B1 | 1/2003 | Vanbuskirk |
| 6,510,417 B1 | 1/2003 | Woods |
| 6,513,006 B2 | 1/2003 | Howard |
| 6,522,746 B1 | 2/2003 | Marchok |
| 6,523,061 B1 | 2/2003 | Halverson |
| 6,532,444 B1 | 3/2003 | Weber |
| 6,539,348 B1 | 3/2003 | Bond |
| 6,549,629 B2 | 4/2003 | Finn |
| 6,553,372 B1 | 4/2003 | Brassell |
| 6,556,970 B1 | 4/2003 | Sasaki |
| 6,556,973 B1 | 4/2003 | Lewin |
| 6,560,576 B1 | 5/2003 | Cohen |
| 6,560,590 B1 | 5/2003 | Shwe |
| 6,567,778 B1 | 5/2003 | ChaoChang |
| 6,567,797 B1 | 5/2003 | Schuetze |
| 6,567,805 B1 | 5/2003 | Johnson |
| 6,570,555 B1 | 5/2003 | Prevost |
| 6,570,964 B1 | 5/2003 | Murveit |
| 6,571,279 B1 | 5/2003 | Herz |
| 6,574,597 B1 | 6/2003 | Mohri |
| 6,574,624 B1 | 6/2003 | Johnson |
| 6,578,022 B1 | 6/2003 | Foulger |
| 6,581,103 B1 | 6/2003 | Dengler |
| 6,584,439 B1 | 6/2003 | Geilhufe |
| 6,587,858 B1 | 7/2003 | Strazza |
| 6,591,185 B1 | 7/2003 | Polidi |
| 6,591,239 B1 | 7/2003 | McCall |
| 6,594,257 B1 | 7/2003 | Doshi |
| 6,594,367 B1 | 7/2003 | Marash |
| 6,598,018 B1 | 7/2003 | Junqua |
| 6,601,026 B2 | 7/2003 | Appelt |
| 6,601,029 B1 | 7/2003 | Pickering |
| 6,604,075 B1 | 8/2003 | Brown |
| 6,604,077 B2 | 8/2003 | Dragosh |
| 6,606,598 B1 | 8/2003 | Holthouse |
| 6,611,692 B2 | 8/2003 | Raffel |
| 6,614,773 B1 | 9/2003 | Maxemchuk |
| 6,615,172 B1 | 9/2003 | Bennett |
| 6,622,119 B1 | 9/2003 | Ramaswamy |
| 6,629,066 B1 | 9/2003 | Jackson |
| 6,631,346 B1 | 10/2003 | Karaorman |
| 6,631,351 B1 | 10/2003 | Ramachandran |
| 6,633,846 B1 | 10/2003 | Bennett |
| 6,636,790 B1 | 10/2003 | Lightner |
| 6,643,620 B1 | 11/2003 | Contolini |
| 6,647,363 B2 | 11/2003 | Claassen |
| 6,650,747 B1 | 11/2003 | Bala |
| 6,658,388 B1 | 12/2003 | Kleindienst |
| 6,678,680 B1 | 1/2004 | Woo |
| 6,681,206 B1 | 1/2004 | Gorin |
| 6,691,151 B1 | 2/2004 | Cheyer |
| 6,701,294 B1 | 3/2004 | Ball |
| 6,704,396 B2 | 3/2004 | Parolkar |
| 6,704,576 B1 | 3/2004 | Brachman |
| 6,704,708 B1 | 3/2004 | Pickering |
| 6,707,421 B1 | 3/2004 | Drury |
| 6,708,150 B1 | 3/2004 | Hirayama |
| 6,721,001 B1 | 4/2004 | Berstis |
| 6,721,633 B2 | 4/2004 | Funk |
| 6,721,706 B1 | 4/2004 | Strubbe |
| 6,726,636 B2 | 4/2004 | DerGhazarian |
| 6,732,088 B1 | 5/2004 | Glance |
| 6,735,592 B1 | 5/2004 | Neumann |
| 6,739,556 B1 | 5/2004 | Langston |
| 6,741,931 B1 | 5/2004 | Kohut |
| 6,742,021 B1 | 5/2004 | Halverson |
| 6,745,161 B1 | 6/2004 | Arnold |
| 6,751,591 B1 | 6/2004 | Gorin |
| 6,751,612 B1 | 6/2004 | Schuetze |
| 6,754,485 B1 | 6/2004 | Obradovich |
| 6,754,627 B2 | 6/2004 | Woodward |
| 6,754,647 B1 | 6/2004 | Tackett |
| 6,757,544 B2 | 6/2004 | Rangarajan |
| 6,757,718 B1 | 6/2004 | Halverson |
| 6,785,651 B1 | 8/2004 | Wang |
| 6,795,808 B1 | 9/2004 | Strubbe |
| 6,801,604 B2 | 10/2004 | Maes |
| 6,801,893 B1 | 10/2004 | Backfried |
| 6,804,330 B1 | 10/2004 | Jones |
| 6,810,375 B1 | 10/2004 | Ejerhed |
| 6,813,341 B1 | 11/2004 | Mahoney |
| 6,816,830 B1 | 11/2004 | Kempe |
| 6,829,603 B1 | 12/2004 | Chai |
| 6,832,230 B1 | 12/2004 | Zilliacus |
| 6,833,848 B1 | 12/2004 | Wolff |
| 6,850,603 B1 | 2/2005 | Eberle |
| 6,856,990 B2 | 2/2005 | Barile |
| 6,865,481 B2 | 3/2005 | Kawazoe |
| 6,868,380 B2 | 3/2005 | Kroeker |
| 6,868,385 B1 | 3/2005 | Gerson |
| 6,871,179 B1 | 3/2005 | Kist |
| 6,873,837 B1 | 3/2005 | Yoshioka |
| 6,877,001 B2 | 4/2005 | Wolf |
| 6,877,134 B1 | 4/2005 | Fuller |
| 6,882,970 B1 | 4/2005 | Garner |
| 6,901,366 B1 | 5/2005 | Kuhn |
| 6,910,003 B1 | 6/2005 | Arnold |
| 6,912,498 B2 | 6/2005 | Stevens |
| 6,915,126 B2 | 7/2005 | Mazzara, Jr. |
| 6,928,614 B1 | 8/2005 | Everhart |
| 6,934,756 B2 | 8/2005 | Maes |
| 6,937,977 B2 | 8/2005 | Gerson |
| 6,937,982 B2 | 8/2005 | Kitaoka |
| 6,941,266 B1 | 9/2005 | Gorin |
| 6,944,594 B2 | 9/2005 | Busayapongchai |

(56) References Cited

U.S. PATENT DOCUMENTS

| | | | |
|---|---|---|---|
| 6,950,821 | B2 | 9/2005 | Faybishenko |
| 6,954,755 | B2 | 10/2005 | Reisman |
| 6,959,276 | B2 | 10/2005 | Droppo |
| 6,961,700 | B2 | 11/2005 | Mitchell |
| 6,963,759 | B1 | 11/2005 | Gerson |
| 6,964,023 | B2 | 11/2005 | Maes |
| 6,968,311 | B2 | 11/2005 | Knockeart |
| 6,973,387 | B2 | 12/2005 | Masclet |
| 6,975,993 | B1 | 12/2005 | Keiller |
| 6,980,092 | B2 | 12/2005 | Turnbull |
| 6,983,055 | B2 | 1/2006 | Luo |
| 6,990,513 | B2 | 1/2006 | Belfiore |
| 6,996,531 | B2 | 2/2006 | Korall |
| 7,003,463 | B1 | 2/2006 | Maes |
| 7,016,849 | B2 | 3/2006 | Arnold |
| 7,020,609 | B2 | 3/2006 | Thrift |
| 7,024,364 | B2 | 4/2006 | Guerra |
| 7,027,586 | B2 | 4/2006 | Bushey |
| 7,027,974 | B1 * | 4/2006 | Busch .................. G06F 17/271 704/4 |
| 7,027,975 | B1 | 4/2006 | Pazandak |
| 7,035,415 | B2 | 4/2006 | Belt |
| 7,036,128 | B1 | 4/2006 | Julia |
| 7,043,425 | B2 | 5/2006 | Pao |
| 7,054,817 | B2 | 5/2006 | Shao |
| 7,058,890 | B2 | 6/2006 | George |
| 7,062,488 | B1 | 6/2006 | Reisman |
| 7,069,220 | B2 | 6/2006 | Coffman |
| 7,072,834 | B2 | 7/2006 | Zhou |
| 7,072,888 | B1 | 7/2006 | Perkins |
| 7,076,362 | B2 | 7/2006 | Ohtsuji |
| 7,082,469 | B2 | 7/2006 | Gold |
| 7,085,708 | B2 | 8/2006 | Manson |
| 7,092,928 | B1 | 8/2006 | Elad |
| 7,107,210 | B2 | 9/2006 | Deng |
| 7,107,218 | B1 | 9/2006 | Preston |
| 7,110,951 | B1 | 9/2006 | Lemelson |
| 7,127,395 | B1 | 10/2006 | Gorin |
| 7,127,400 | B2 | 10/2006 | Koch |
| 7,130,390 | B2 | 10/2006 | Abburi |
| 7,136,875 | B2 | 11/2006 | Anderson |
| 7,137,126 | B1 | 11/2006 | Coffman |
| 7,143,037 | B1 | 11/2006 | Chestnut |
| 7,143,039 | B1 | 11/2006 | Stifelman |
| 7,146,319 | B2 | 12/2006 | Hunt |
| 7,149,696 | B2 | 12/2006 | Shimizu |
| 7,165,028 | B2 | 1/2007 | Gong |
| 7,170,993 | B2 | 1/2007 | Anderson |
| 7,171,291 | B2 | 1/2007 | Obradovich |
| 7,174,300 | B2 | 2/2007 | Bush |
| 7,177,798 | B2 | 2/2007 | Hsu |
| 7,184,957 | B2 | 2/2007 | Brookes |
| 7,190,770 | B2 | 3/2007 | Ando |
| 7,197,069 | B2 | 3/2007 | Agazzi |
| 7,197,460 | B1 | 3/2007 | Gupta |
| 7,203,644 | B2 | 4/2007 | Anderson |
| 7,206,418 | B2 | 4/2007 | Yang |
| 7,207,011 | B2 | 4/2007 | Mulvey |
| 7,215,941 | B2 | 5/2007 | Beckmann |
| 7,228,276 | B2 | 6/2007 | Omote |
| 7,231,343 | B1 | 6/2007 | Treadgold |
| 7,236,923 | B1 | 6/2007 | Gupta |
| 7,254,482 | B2 | 8/2007 | Kawasaki |
| 7,272,212 | B2 | 9/2007 | Eberle |
| 7,277,854 | B2 | 10/2007 | Bennett |
| 7,283,829 | B2 | 10/2007 | Christenson |
| 7,283,951 | B2 | 10/2007 | Marchisio |
| 7,289,606 | B2 | 10/2007 | Sibal |
| 7,299,186 | B2 | 11/2007 | Kuzunuki |
| 7,301,093 | B2 | 11/2007 | Sater |
| 7,305,381 | B1 | 12/2007 | Poppink |
| 7,321,850 | B2 | 1/2008 | Wakita |
| 7,328,155 | B2 | 2/2008 | Endo |
| 7,337,116 | B2 | 2/2008 | Charlesworth |
| 7,340,040 | B1 | 3/2008 | Saylor |
| 7,366,285 | B2 | 4/2008 | Parolkar |
| 7,366,669 | B2 | 4/2008 | Nishitani |
| 7,376,645 | B2 | 5/2008 | Bernard |
| 7,386,443 | B1 | 6/2008 | Parthasarathy |
| 7,398,209 | B2 | 7/2008 | Kennewick |
| 7,406,421 | B2 | 7/2008 | Odinak |
| 7,415,100 | B2 | 8/2008 | Cooper |
| 7,415,414 | B2 | 8/2008 | Azara |
| 7,421,393 | B1 | 9/2008 | DiFabbrizio |
| 7,424,431 | B2 | 9/2008 | Greene |
| 7,447,635 | B1 | 11/2008 | Konopka |
| 7,451,088 | B1 | 11/2008 | Ehlen |
| 7,454,368 | B2 | 11/2008 | Stillman |
| 7,454,608 | B2 | 11/2008 | Gopalakrishnan |
| 7,461,059 | B2 | 12/2008 | Richardson |
| 7,472,020 | B2 | 12/2008 | Brulle-Drews |
| 7,472,060 | B1 | 12/2008 | Gorin |
| 7,472,075 | B2 | 12/2008 | Odinak |
| 7,477,909 | B2 | 1/2009 | Roth |
| 7,478,036 | B2 | 1/2009 | Shen |
| 7,487,088 | B1 | 2/2009 | Gorin |
| 7,487,110 | B2 | 2/2009 | Bennett |
| 7,493,259 | B2 | 2/2009 | Jones |
| 7,493,559 | B1 | 2/2009 | Wolff |
| 7,502,672 | B1 | 3/2009 | Kolls |
| 7,502,738 | B2 | 3/2009 | Kennewick |
| 7,516,076 | B2 | 4/2009 | Walker |
| 7,529,675 | B2 | 5/2009 | Maes |
| 7,536,297 | B2 | 5/2009 | Byrd |
| 7,536,374 | B2 | 5/2009 | Au |
| 7,542,894 | B2 | 6/2009 | Murata |
| 7,546,382 | B2 | 6/2009 | Healey |
| 7,548,491 | B2 | 6/2009 | Macfarlane |
| 7,552,054 | B1 | 6/2009 | Stifelman |
| 7,558,730 | B2 | 7/2009 | Davis |
| 7,574,362 | B2 | 8/2009 | Walker |
| 7,577,244 | B2 | 8/2009 | Taschereau |
| 7,606,708 | B2 | 10/2009 | Hwang |
| 7,606,712 | B1 | 10/2009 | Smith |
| 7,620,549 | B2 | 11/2009 | DiCristo |
| 7,634,409 | B2 | 12/2009 | Kennewick |
| 7,640,006 | B2 | 12/2009 | Portman |
| 7,640,160 | B2 | 12/2009 | DiCristo |
| 7,640,272 | B2 | 12/2009 | Mahajan |
| 7,672,931 | B2 | 3/2010 | Hurst-Hiller |
| 7,676,365 | B2 | 3/2010 | Hwang |
| 7,676,369 | B2 | 3/2010 | Fujimoto |
| 7,684,977 | B2 | 3/2010 | Morikawa |
| 7,693,720 | B2 | 4/2010 | Kennewick |
| 7,697,673 | B2 | 4/2010 | Chiu |
| 7,706,616 | B2 | 4/2010 | Kristensson |
| 7,729,916 | B2 | 6/2010 | Coffman |
| 7,729,918 | B2 | 6/2010 | Walker |
| 7,729,920 | B2 | 6/2010 | Chaar |
| 7,734,287 | B2 | 6/2010 | Ying |
| 7,748,021 | B2 | 6/2010 | Obradovich |
| 7,788,084 | B2 | 8/2010 | Brun |
| 7,792,257 | B1 | 9/2010 | Vanier |
| 7,801,731 | B2 | 9/2010 | Odinak |
| 7,809,570 | B2 | 10/2010 | Kennewick |
| 7,818,176 | B2 | 10/2010 | Freeman |
| 7,831,426 | B2 | 11/2010 | Bennett |
| 7,831,433 | B1 | 11/2010 | Belvin |
| 7,856,358 | B2 | 12/2010 | Ho |
| 7,873,519 | B2 | 1/2011 | Bennett |
| 7,873,523 | B2 | 1/2011 | Potter |
| 7,873,654 | B2 | 1/2011 | Bernard |
| 7,881,936 | B2 | 2/2011 | Longe |
| 7,890,324 | B2 | 2/2011 | Bangalore |
| 7,894,849 | B2 | 2/2011 | Kass |
| 7,902,969 | B2 | 3/2011 | Obradovich |
| 7,917,367 | B2 | 3/2011 | DiCristo |
| 7,920,682 | B2 | 4/2011 | Byrne |
| 7,949,529 | B2 | 5/2011 | Weider |
| 7,949,537 | B2 | 5/2011 | Walker |
| 7,953,732 | B2 | 5/2011 | Frank |
| 7,974,875 | B1 | 7/2011 | Quilici |
| 7,983,917 | B2 | 7/2011 | Kennewick |
| 7,984,287 | B2 | 7/2011 | Gopalakrishnan |

(56) References Cited

U.S. PATENT DOCUMENTS

| | | |
|---|---|---|
| 8,005,683 B2 | 8/2011 | Tessel |
| 8,015,006 B2 | 9/2011 | Kennewick |
| 8,024,186 B1 | 9/2011 | De Bonet |
| 8,027,965 B2 | 9/2011 | Takehara |
| 8,032,383 B1 | 10/2011 | Bhardwaj |
| 8,060,367 B2 | 11/2011 | Keaveney |
| 8,069,046 B2 | 11/2011 | Kennewick |
| 8,073,681 B2 | 12/2011 | Baldwin |
| 8,077,975 B2 | 12/2011 | Ma |
| 8,082,153 B2 | 12/2011 | Coffman |
| 8,086,463 B2 | 12/2011 | Ativanichayaphong |
| 8,103,510 B2 | 1/2012 | Sato |
| 8,112,275 B2 | 2/2012 | Kennewick |
| 8,140,327 B2 | 3/2012 | Kennewick |
| 8,140,335 B2 | 3/2012 | Kennewick |
| 8,145,489 B2 | 3/2012 | Freeman |
| 8,150,694 B2 | 4/2012 | Kennewick |
| 8,155,962 B2 | 4/2012 | Kennewick |
| 8,170,867 B2 | 5/2012 | Germain |
| 8,180,037 B1 | 5/2012 | Delker |
| 8,195,468 B2 | 6/2012 | Weider |
| 8,200,485 B1 | 6/2012 | Lee |
| 8,204,751 B1 | 6/2012 | Di Fabbrizio |
| 8,219,399 B2 | 7/2012 | Lutz |
| 8,219,599 B2 | 7/2012 | Tunstall-Pedoe |
| 8,224,652 B2 | 7/2012 | Wang |
| 8,255,224 B2 | 8/2012 | Singleton |
| 8,326,599 B2 * | 12/2012 | Tomeh ................ G06F 17/2818 704/10 |
| 8,326,627 B2 | 12/2012 | Kennewick |
| 8,326,634 B2 | 12/2012 | DiCristo |
| 8,326,637 B2 | 12/2012 | Baldwin |
| 8,332,224 B2 | 12/2012 | DiCristo |
| 8,340,975 B1 | 12/2012 | Rosenberger |
| 8,346,563 B1 | 1/2013 | Hjelm |
| 8,370,147 B2 | 2/2013 | Kennewick |
| 8,447,607 B2 | 5/2013 | Weider |
| 8,447,651 B1 | 5/2013 | Scholl |
| 8,452,598 B2 | 5/2013 | Kennewick |
| 8,503,995 B2 | 8/2013 | Ramer |
| 8,509,403 B2 | 8/2013 | Chiu |
| 8,515,765 B2 | 8/2013 | Baldwin |
| 8,527,274 B2 | 9/2013 | Freeman |
| 8,577,671 B1 | 11/2013 | Barve |
| 8,589,161 B2 | 11/2013 | Kennewick |
| 8,612,205 B2 * | 12/2013 | Hanneman .......... G06F 17/2827 704/2 |
| 8,612,206 B2 * | 12/2013 | Chalabi ............... G06F 17/2863 704/8 |
| 8,620,659 B2 | 12/2013 | DiCristo |
| 8,719,005 B1 | 5/2014 | Lee |
| 8,719,009 B2 | 5/2014 | Baldwin |
| 8,719,026 B2 | 5/2014 | Kennewick |
| 8,731,929 B2 | 5/2014 | Kennewick |
| 8,738,380 B2 | 5/2014 | Baldwin |
| 8,849,652 B2 | 9/2014 | Weider |
| 8,849,670 B2 | 9/2014 | DiCristo |
| 8,849,696 B2 | 9/2014 | Pansari |
| 8,849,791 B1 | 9/2014 | Hertschuh |
| 8,886,536 B2 | 11/2014 | Freeman |
| 8,972,243 B1 * | 3/2015 | Strom .................... G10L 15/193 704/1 |
| 8,983,839 B2 | 3/2015 | Kennewick |
| 9,009,046 B1 | 4/2015 | Stewart |
| 9,015,049 B2 | 4/2015 | Baldwin |
| 9,037,455 B1 | 5/2015 | Faaborg |
| 9,070,366 B1 | 6/2015 | Mathias |
| 9,070,367 B1 | 6/2015 | Hoffmeister |
| 9,105,266 B2 | 8/2015 | Baldwin |
| 9,171,541 B2 | 10/2015 | Kennewick |
| 9,269,097 B2 | 2/2016 | Freeman |
| 9,305,548 B2 | 4/2016 | Kennewick |
| 9,308,445 B1 | 4/2016 | Merzenich |
| 9,406,078 B2 | 8/2016 | Freeman |
| 9,443,514 B1 | 9/2016 | Taubman |
| 9,502,025 B2 | 11/2016 | Kennewick |
| 2001/0039492 A1 | 11/2001 | Nemoto |
| 2001/0041980 A1 | 11/2001 | Howard |
| 2001/0047261 A1 | 11/2001 | Kassan |
| 2001/0049601 A1 | 12/2001 | Kroeker |
| 2001/0054087 A1 | 12/2001 | Flom |
| 2002/0002548 A1 | 1/2002 | Roundtree |
| 2002/0007267 A1 | 1/2002 | Batchilo |
| 2002/0010584 A1 | 1/2002 | Schultz |
| 2002/0015500 A1 | 2/2002 | Belt |
| 2002/0022927 A1 | 2/2002 | Lemelson |
| 2002/0022956 A1 | 2/2002 | Ukrainczyk |
| 2002/0029186 A1 | 3/2002 | Roth |
| 2002/0029261 A1 | 3/2002 | Shibata |
| 2002/0032752 A1 | 3/2002 | Gold |
| 2002/0035501 A1 | 3/2002 | Handel |
| 2002/0040297 A1 | 4/2002 | Tsiao |
| 2002/0049535 A1 | 4/2002 | Rigo |
| 2002/0049805 A1 | 4/2002 | Yamada |
| 2002/0059068 A1 | 5/2002 | Rose |
| 2002/0065568 A1 | 5/2002 | Silfvast |
| 2002/0067839 A1 | 6/2002 | Heinrich |
| 2002/0069059 A1 | 6/2002 | Smith |
| 2002/0069071 A1 | 6/2002 | Knockeart |
| 2002/0073176 A1 | 6/2002 | Ikeda |
| 2002/0082911 A1 | 6/2002 | Dunn |
| 2002/0087312 A1 | 7/2002 | Lee |
| 2002/0087326 A1 | 7/2002 | Lee |
| 2002/0087525 A1 | 7/2002 | Abbott |
| 2002/0107694 A1 | 8/2002 | Lerg |
| 2002/0120609 A1 | 8/2002 | Lang |
| 2002/0124050 A1 | 9/2002 | Middeljans |
| 2002/0133347 A1 | 9/2002 | Schoneburg |
| 2002/0133354 A1 | 9/2002 | Ross |
| 2002/0133402 A1 | 9/2002 | Faber |
| 2002/0135618 A1 | 9/2002 | Maes |
| 2002/0138248 A1 | 9/2002 | Corston-Oliver |
| 2002/0143532 A1 | 10/2002 | McLean |
| 2002/0143535 A1 | 10/2002 | Kist |
| 2002/0152260 A1 | 10/2002 | Chen |
| 2002/0161646 A1 | 10/2002 | Gailey |
| 2002/0161647 A1 | 10/2002 | Gailey |
| 2002/0169597 A1 | 11/2002 | Fain |
| 2002/0173333 A1 | 11/2002 | Buchholz |
| 2002/0173961 A1 | 11/2002 | Guerra |
| 2002/0184373 A1 | 12/2002 | Maes |
| 2002/0188602 A1 | 12/2002 | Stubler |
| 2002/0198714 A1 | 12/2002 | Zhou |
| 2003/0005033 A1 | 1/2003 | Mohan |
| 2003/0014261 A1 | 1/2003 | Kageyama |
| 2003/0016835 A1 | 1/2003 | Elko |
| 2003/0036903 A1 | 2/2003 | Konopka |
| 2003/0046071 A1 | 3/2003 | Wyman |
| 2003/0046281 A1 | 3/2003 | Son |
| 2003/0046346 A1 | 3/2003 | Mumick |
| 2003/0064709 A1 | 4/2003 | Gailey |
| 2003/0065427 A1 | 4/2003 | Funk |
| 2003/0069734 A1 | 4/2003 | Everhart |
| 2003/0069880 A1 * | 4/2003 | Harrison ........... G06F 17/30663 |
| 2003/0088421 A1 | 5/2003 | Maes |
| 2003/0093419 A1 | 5/2003 | Bangalore |
| 2003/0097249 A1 | 5/2003 | Walker |
| 2003/0110037 A1 | 6/2003 | Walker |
| 2003/0112267 A1 | 6/2003 | Belrose |
| 2003/0115062 A1 | 6/2003 | Walker |
| 2003/0120493 A1 | 6/2003 | Gupta |
| 2003/0135488 A1 | 7/2003 | Amir |
| 2003/0144846 A1 | 7/2003 | Denenberg |
| 2003/0158731 A1 | 8/2003 | Falcon |
| 2003/0161448 A1 | 8/2003 | Parolkar |
| 2003/0167167 A1 | 9/2003 | Gong |
| 2003/0174155 A1 | 9/2003 | Weng |
| 2003/0182132 A1 | 9/2003 | Niemoeller |
| 2003/0187643 A1 | 10/2003 | VanThong |
| 2003/0204492 A1 | 10/2003 | Wolf |
| 2003/0206640 A1 | 11/2003 | Malvar |
| 2003/0212550 A1 | 11/2003 | Ubale |
| 2003/0212558 A1 | 11/2003 | Matula |
| 2003/0212562 A1 | 11/2003 | Patel |

(56) References Cited

U.S. PATENT DOCUMENTS

| | | | |
|---|---|---|---|
| 2003/0225825 A1 | 12/2003 | Healey | |
| 2003/0233230 A1 | 12/2003 | Ammicht | |
| 2003/0236664 A1 | 12/2003 | Sharma | |
| 2004/0006475 A1 | 1/2004 | Ehlen | |
| 2004/0010358 A1 | 1/2004 | Oesterling | |
| 2004/0025115 A1 | 2/2004 | Sienel | |
| 2004/0030741 A1 | 2/2004 | Wolton | |
| 2004/0036601 A1 | 2/2004 | Obradovich | |
| 2004/0044516 A1 | 3/2004 | Kennewick | |
| 2004/0093567 A1* | 5/2004 | Schabes | G06F 17/273 715/257 |
| 2004/0098245 A1 | 5/2004 | Walker | |
| 2004/0117179 A1 | 6/2004 | Balasuriya | |
| 2004/0117804 A1 | 6/2004 | Scahill | |
| 2004/0122673 A1 | 6/2004 | Park | |
| 2004/0122674 A1 | 6/2004 | Bangalore | |
| 2004/0133793 A1 | 7/2004 | Ginter | |
| 2004/0140989 A1 | 7/2004 | Papageorge | |
| 2004/0143440 A1 | 7/2004 | Prasad | |
| 2004/0148154 A1 | 7/2004 | Acero | |
| 2004/0148170 A1 | 7/2004 | Acero | |
| 2004/0158555 A1 | 8/2004 | Seedman | |
| 2004/0166832 A1 | 8/2004 | Portman | |
| 2004/0167771 A1 | 8/2004 | Duan | |
| 2004/0172247 A1 | 9/2004 | Yoon | |
| 2004/0172258 A1 | 9/2004 | Dominach | |
| 2004/0189697 A1 | 9/2004 | Fukuoka | |
| 2004/0193408 A1 | 9/2004 | Hunt | |
| 2004/0193420 A1 | 9/2004 | Kennewick | |
| 2004/0199375 A1 | 10/2004 | Ehsani | |
| 2004/0199389 A1 | 10/2004 | Geiger | |
| 2004/0201607 A1 | 10/2004 | Mulvey | |
| 2004/0205671 A1 | 10/2004 | Sukehiro | |
| 2004/0243393 A1 | 12/2004 | Wang | |
| 2004/0243417 A9 | 12/2004 | Pitts | |
| 2004/0247092 A1 | 12/2004 | Timmins | |
| 2004/0249636 A1 | 12/2004 | Applebaum | |
| 2005/0015256 A1 | 1/2005 | Kargman | |
| 2005/0021331 A1 | 1/2005 | Huang | |
| 2005/0021334 A1 | 1/2005 | Iwahashi | |
| 2005/0021470 A1 | 1/2005 | Martin | |
| 2005/0021826 A1 | 1/2005 | Kumar | |
| 2005/0033574 A1 | 2/2005 | Kim | |
| 2005/0033582 A1 | 2/2005 | Gadd | |
| 2005/0043940 A1 | 2/2005 | Elder | |
| 2005/0080632 A1 | 4/2005 | Endo | |
| 2005/0102282 A1 | 5/2005 | Linden | |
| 2005/0114116 A1 | 5/2005 | Fiedler | |
| 2005/0125232 A1 | 6/2005 | Gadd | |
| 2005/0131673 A1 | 6/2005 | Koizumi | |
| 2005/0137850 A1 | 6/2005 | Odell | |
| 2005/0137877 A1 | 6/2005 | Oesterling | |
| 2005/0143994 A1 | 6/2005 | Mori | |
| 2005/0144013 A1 | 6/2005 | Fujimoto | |
| 2005/0144187 A1 | 6/2005 | Che | |
| 2005/0149319 A1 | 7/2005 | Honda | |
| 2005/0216254 A1 | 9/2005 | Gupta | |
| 2005/0222763 A1 | 10/2005 | Uyeki | |
| 2005/0234637 A1 | 10/2005 | Obradovich | |
| 2005/0234727 A1 | 10/2005 | Chiu | |
| 2005/0246174 A1 | 11/2005 | DeGolia | |
| 2005/0283364 A1 | 12/2005 | Longe | |
| 2005/0283532 A1 | 12/2005 | Kim | |
| 2005/0283752 A1 | 12/2005 | Fruchter | |
| 2006/0041431 A1 | 2/2006 | Maes | |
| 2006/0046740 A1 | 3/2006 | Johnson | |
| 2006/0047509 A1 | 3/2006 | Ding | |
| 2006/0072738 A1 | 4/2006 | Louis | |
| 2006/0074670 A1 | 4/2006 | Weng | |
| 2006/0074671 A1 | 4/2006 | Farmaner | |
| 2006/0080098 A1 | 4/2006 | Campbell | |
| 2006/0100851 A1 | 5/2006 | Schonebeck | |
| 2006/0106769 A1 | 5/2006 | Gibbs | |
| 2006/0129409 A1 | 6/2006 | Mizutani | |
| 2006/0130002 A1 | 6/2006 | Hirayama | |
| 2006/0182085 A1 | 8/2006 | Sweeney | |
| 2006/0206310 A1 | 9/2006 | Ravikumar | |
| 2006/0217133 A1 | 9/2006 | Christenson | |
| 2006/0236343 A1 | 10/2006 | Chang | |
| 2006/0242017 A1 | 10/2006 | Libes | |
| 2006/0253247 A1 | 11/2006 | de Silva | |
| 2006/0253281 A1 | 11/2006 | Letzt | |
| 2006/0285662 A1 | 12/2006 | Yin | |
| 2007/0011159 A1 | 1/2007 | Hillis | |
| 2007/0033005 A1 | 2/2007 | Di Cristo | |
| 2007/0033020 A1 | 2/2007 | Francois | |
| 2007/0033526 A1 | 2/2007 | Thompson | |
| 2007/0038436 A1 | 2/2007 | Cristo | |
| 2007/0038445 A1 | 2/2007 | Helbing | |
| 2007/0043569 A1 | 2/2007 | Potter | |
| 2007/0043574 A1 | 2/2007 | Coffman | |
| 2007/0043868 A1 | 2/2007 | Kumar | |
| 2007/0050191 A1 | 3/2007 | Weider | |
| 2007/0050279 A1 | 3/2007 | Huang | |
| 2007/0055525 A1 | 3/2007 | Kennewick | |
| 2007/0061067 A1 | 3/2007 | Zeinstra | |
| 2007/0061735 A1 | 3/2007 | Hoffberg | |
| 2007/0073544 A1 | 3/2007 | Millett | |
| 2007/0078708 A1 | 4/2007 | Yu | |
| 2007/0078709 A1 | 4/2007 | Rajaram | |
| 2007/0078814 A1 | 4/2007 | Flowers | |
| 2007/0094003 A1 | 4/2007 | Huang | |
| 2007/0100797 A1 | 5/2007 | Thun | |
| 2007/0112555 A1 | 5/2007 | Lavi | |
| 2007/0112630 A1 | 5/2007 | Lau | |
| 2007/0118357 A1 | 5/2007 | Kasravi | |
| 2007/0124057 A1 | 5/2007 | Prieto | |
| 2007/0135101 A1 | 6/2007 | Ramati | |
| 2007/0146833 A1 | 6/2007 | Satomi | |
| 2007/0162296 A1 | 7/2007 | Altberg | |
| 2007/0174258 A1 | 7/2007 | Jones | |
| 2007/0179778 A1 | 8/2007 | Gong | |
| 2007/0185859 A1 | 8/2007 | Flowers | |
| 2007/0186165 A1 | 8/2007 | Maislos | |
| 2007/0192309 A1 | 8/2007 | Fischer | |
| 2007/0198267 A1 | 8/2007 | Jones | |
| 2007/0203699 A1 | 8/2007 | Nagashima | |
| 2007/0203736 A1 | 8/2007 | Ashton | |
| 2007/0208732 A1 | 9/2007 | Flowers | |
| 2007/0214182 A1 | 9/2007 | Rosenberg | |
| 2007/0250901 A1 | 10/2007 | McIntire | |
| 2007/0265850 A1 | 11/2007 | Kennewick | |
| 2007/0266257 A1 | 11/2007 | Camaisa | |
| 2007/0276651 A1 | 11/2007 | Bliss | |
| 2007/0294615 A1 | 12/2007 | Sathe | |
| 2007/0299824 A1 | 12/2007 | Pan | |
| 2008/0014908 A1 | 1/2008 | Vasant | |
| 2008/0034032 A1 | 2/2008 | Healey | |
| 2008/0046311 A1 | 2/2008 | Shahine | |
| 2008/0059188 A1 | 3/2008 | Konopka | |
| 2008/0065386 A1 | 3/2008 | Cross | |
| 2008/0065389 A1 | 3/2008 | Cross | |
| 2008/0065390 A1 | 3/2008 | Ativanichayaphong | |
| 2008/0086455 A1 | 4/2008 | Meisels | |
| 2008/0091406 A1 | 4/2008 | Baldwin | |
| 2008/0103761 A1 | 5/2008 | Printz | |
| 2008/0103781 A1 | 5/2008 | Wasson | |
| 2008/0104071 A1 | 5/2008 | Pragada | |
| 2008/0109285 A1 | 5/2008 | Reuther | |
| 2008/0115163 A1 | 5/2008 | Gilboa | |
| 2008/0126091 A1 | 5/2008 | Clark | |
| 2008/0133215 A1 | 6/2008 | Sarukkai | |
| 2008/0140385 A1 | 6/2008 | Mahajan | |
| 2008/0147396 A1 | 6/2008 | Wang | |
| 2008/0147410 A1 | 6/2008 | Odinak | |
| 2008/0147637 A1 | 6/2008 | Li | |
| 2008/0154604 A1 | 6/2008 | Sathish | |
| 2008/0162471 A1 | 7/2008 | Bernard | |
| 2008/0177530 A1 | 7/2008 | Cross | |
| 2008/0184164 A1 | 7/2008 | Di Fabbrizio | |
| 2008/0189110 A1 | 8/2008 | Freeman | |
| 2008/0228496 A1 | 9/2008 | Yu | |
| 2008/0235023 A1 | 9/2008 | Kennewick | |
| 2008/0235027 A1 | 9/2008 | Cross | |

(56) References Cited

U.S. PATENT DOCUMENTS

| | | |
|---|---|---|
| 2008/0269958 A1 | 10/2008 | Filev |
| 2008/0270135 A1 | 10/2008 | Goel |
| 2008/0270224 A1 | 10/2008 | Portman |
| 2008/0294437 A1 | 11/2008 | Nakano |
| 2008/0294994 A1 | 11/2008 | Kruger |
| 2008/0306743 A1 | 12/2008 | Di Fabbrizio |
| 2008/0319751 A1 | 12/2008 | Kennewick |
| 2009/0006077 A1 | 1/2009 | Keaveney |
| 2009/0006194 A1 | 1/2009 | Sridharan |
| 2009/0018829 A1 | 1/2009 | Kuperstein |
| 2009/0024476 A1 | 1/2009 | Baar |
| 2009/0030686 A1 | 1/2009 | Weng |
| 2009/0052635 A1 | 2/2009 | Jones |
| 2009/0055176 A1 | 2/2009 | Hu |
| 2009/0067599 A1 | 3/2009 | Agarwal |
| 2009/0076827 A1 | 3/2009 | Bulitta |
| 2009/0106029 A1 | 4/2009 | DeLine |
| 2009/0117885 A1 | 5/2009 | Roth |
| 2009/0144131 A1 | 6/2009 | Chiu |
| 2009/0144271 A1 | 6/2009 | Richardson |
| 2009/0150156 A1 | 6/2009 | Kennewick |
| 2009/0157382 A1 | 6/2009 | Bar |
| 2009/0164216 A1 | 6/2009 | Chengalvarayan |
| 2009/0171664 A1 | 7/2009 | Kennewick |
| 2009/0171912 A1 | 7/2009 | Nash |
| 2009/0197582 A1 | 8/2009 | Lewis |
| 2009/0216540 A1 | 8/2009 | Tessel |
| 2009/0248565 A1 | 10/2009 | Chuang |
| 2009/0248605 A1 | 10/2009 | Mitchell |
| 2009/0259561 A1 | 10/2009 | Boys |
| 2009/0259646 A1 | 10/2009 | Fujita |
| 2009/0265163 A1 | 10/2009 | Li |
| 2009/0271194 A1 | 10/2009 | Davis |
| 2009/0273563 A1 | 11/2009 | Pryor |
| 2009/0276700 A1 | 11/2009 | Anderson |
| 2009/0287680 A1 | 11/2009 | Paek |
| 2009/0299745 A1 | 12/2009 | Kennewick |
| 2009/0299857 A1 | 12/2009 | Brubaker |
| 2009/0304161 A1 | 12/2009 | Pettyjohn |
| 2009/0307031 A1 | 12/2009 | Winkler |
| 2009/0313026 A1 | 12/2009 | Coffman |
| 2009/0319517 A1 | 12/2009 | Guha |
| 2010/0023320 A1 | 1/2010 | Cristo |
| 2010/0023331 A1 | 1/2010 | Duta |
| 2010/0029261 A1 | 2/2010 | Mikkelsen |
| 2010/0036967 A1 | 2/2010 | Caine |
| 2010/0049501 A1 | 2/2010 | Kennewick |
| 2010/0049514 A1 | 2/2010 | Kennewick |
| 2010/0057443 A1 | 3/2010 | Cristo |
| 2010/0063880 A1 | 3/2010 | Atsmon |
| 2010/0064025 A1 | 3/2010 | Nelimarkka |
| 2010/0094707 A1 | 4/2010 | Freer |
| 2010/0138300 A1 | 6/2010 | Wallis |
| 2010/0145700 A1 | 6/2010 | Kennewick |
| 2010/0185512 A1 | 7/2010 | Borger |
| 2010/0204986 A1 | 8/2010 | Kennewick |
| 2010/0204994 A1 | 8/2010 | Kennewick |
| 2010/0217604 A1 | 8/2010 | Baldwin |
| 2010/0268536 A1 | 10/2010 | Suendermann |
| 2010/0286985 A1 | 11/2010 | Kennewick |
| 2010/0299142 A1 | 11/2010 | Freeman |
| 2010/0312566 A1 | 12/2010 | Odinak |
| 2010/0318357 A1 | 12/2010 | Istvan |
| 2010/0331064 A1 | 12/2010 | Michelstein |
| 2011/0022393 A1 | 1/2011 | Waller |
| 2011/0106527 A1 | 5/2011 | Chiu |
| 2011/0112827 A1 | 5/2011 | Kennewick |
| 2011/0112921 A1 | 5/2011 | Kennewick |
| 2011/0119049 A1 | 5/2011 | Ylonen |
| 2011/0131036 A1 | 6/2011 | DiCristo |
| 2011/0131045 A1 | 6/2011 | Cristo |
| 2011/0231182 A1 | 9/2011 | Weider |
| 2011/0231188 A1 | 9/2011 | Kennewick |
| 2011/0238409 A1 | 9/2011 | Larcheveque |
| 2011/0307167 A1 | 12/2011 | Taschereau |
| 2012/0022857 A1 | 1/2012 | Baldwin |
| 2012/0041753 A1* | 2/2012 | Dymetman ......... G06F 17/2775 704/4 |
| 2012/0046935 A1 | 2/2012 | Nagao |
| 2012/0101809 A1 | 4/2012 | Kennewick |
| 2012/0101810 A1 | 4/2012 | Kennewick |
| 2012/0109753 A1 | 5/2012 | Kennewick |
| 2012/0150620 A1 | 6/2012 | Mandyam |
| 2012/0150636 A1 | 6/2012 | Freeman |
| 2012/0239498 A1 | 9/2012 | Ramer |
| 2012/0240060 A1 | 9/2012 | Pennington |
| 2012/0265528 A1 | 10/2012 | Gruber |
| 2012/0278073 A1 | 11/2012 | Weider |
| 2013/0006734 A1 | 1/2013 | Ocko |
| 2013/0054228 A1 | 2/2013 | Baldwin |
| 2013/0060625 A1 | 3/2013 | Davis |
| 2013/0080177 A1 | 3/2013 | Chen |
| 2013/0211710 A1 | 8/2013 | Kennewick |
| 2013/0253929 A1 | 9/2013 | Weider |
| 2013/0254314 A1 | 9/2013 | Chow |
| 2013/0297293 A1 | 11/2013 | Cristo |
| 2013/0304473 A1 | 11/2013 | Baldwin |
| 2013/0311324 A1 | 11/2013 | Stoll |
| 2013/0332454 A1 | 12/2013 | Stuhec |
| 2013/0339022 A1 | 12/2013 | Baldwin |
| 2014/0006951 A1 | 1/2014 | Hunter |
| 2014/0012577 A1 | 1/2014 | Freeman |
| 2014/0025371 A1 | 1/2014 | Min |
| 2014/0108013 A1 | 4/2014 | Cristo |
| 2014/0156278 A1 | 6/2014 | Kennewick |
| 2014/0195238 A1* | 7/2014 | Terao ................. G10L 15/02 704/251 |
| 2014/0236575 A1 | 8/2014 | Tur |
| 2014/0249821 A1 | 9/2014 | Kennewick |
| 2014/0249822 A1 | 9/2014 | Baldwin |
| 2014/0278413 A1 | 9/2014 | Pitschel |
| 2014/0278416 A1 | 9/2014 | Schuster |
| 2014/0288934 A1 | 9/2014 | Kennewick |
| 2014/0330552 A1* | 11/2014 | Bangalore ............ G11B 27/105 704/4 |
| 2014/0365222 A1 | 12/2014 | Weider |
| 2015/0019211 A1 | 1/2015 | Simard |
| 2015/0019217 A1 | 1/2015 | Cristo |
| 2015/0019227 A1 | 1/2015 | Anandarajah |
| 2015/0066479 A1 | 3/2015 | Pasupalak |
| 2015/0066627 A1 | 3/2015 | Freeman |
| 2015/0073910 A1 | 3/2015 | Kennewick |
| 2015/0095159 A1 | 4/2015 | Kennewick |
| 2015/0142447 A1 | 5/2015 | Kennewick |
| 2015/0170641 A1 | 6/2015 | Kennewick |
| 2015/0193379 A1 | 7/2015 | Mehta |
| 2015/0199339 A1* | 7/2015 | Mirkin .................. G06F 17/289 704/2 |
| 2015/0228276 A1 | 8/2015 | Baldwin |
| 2015/0293917 A1 | 10/2015 | Bufe |
| 2015/0348544 A1 | 12/2015 | Baldwin |
| 2015/0348551 A1 | 12/2015 | Gruber |
| 2015/0364133 A1 | 12/2015 | Freeman |
| 2016/0049152 A1 | 2/2016 | Kennewick |
| 2016/0078482 A1 | 3/2016 | Kennewick |
| 2016/0078491 A1 | 3/2016 | Kennewick |
| 2016/0078504 A1 | 3/2016 | Kennewick |
| 2016/0078773 A1 | 3/2016 | Carter |
| 2016/0110347 A1 | 4/2016 | Kennewick |
| 2016/0148610 A1 | 5/2016 | Kennewick |
| 2016/0148612 A1 | 5/2016 | Guo |
| 2016/0188292 A1 | 6/2016 | Carter |
| 2016/0217785 A1 | 7/2016 | Kennewick |
| 2016/0335676 A1 | 11/2016 | Freeman |

FOREIGN PATENT DOCUMENTS

| | | |
|---|---|---|
| EP | 1320043 A2 | 6/2003 |
| EP | 1646037 | 4/2006 |
| JP | H08263258 | 10/1996 |
| JP | H11249773 | 9/1999 |
| JP | 2001071289 | 3/2001 |
| JP | 2006146881 | 6/2006 |

(56) References Cited

FOREIGN PATENT DOCUMENTS

| | | |
|---|---|---|
| JP | 2008027454 | 2/2008 |
| JP | 2008058465 | 3/2008 |
| JP | 2008139928 | 6/2008 |
| JP | 2011504304 | 2/2011 |
| JP | 2012518847 | 8/2012 |
| WO | 9946763 | 9/1999 |
| WO | 0021232 | 1/2000 |
| WO | 0046792 | 1/2000 |
| WO | 0171609 A2 | 9/2001 |
| WO | 0178065 | 10/2001 |
| WO | 2004072954 | 1/2004 |
| WO | 2005010702 A2 | 2/2005 |
| WO | 2007019318 | 1/2007 |
| WO | 2007021587 | 1/2007 |
| WO | 2007027546 | 1/2007 |
| WO | 2007027989 | 1/2007 |
| WO | 2008098039 | 1/2008 |
| WO | 2008118195 | 1/2008 |
| WO | 2009075912 | 1/2009 |
| WO | 2009145796 | 1/2009 |
| WO | 2009111721 | 9/2009 |
| WO | 2010096752 | 1/2010 |
| WO | 2016044290 | 3/2016 |
| WO | 2016044316 | 3/2016 |
| WO | 2016044319 | 3/2016 |
| WO | 2016044321 | 3/2016 |
| WO | 2016061309 | 4/2016 |

OTHER PUBLICATIONS

Arrington, Michael, "Google Redefines GPS Navigation Landscape: Google Maps Navigation for Android 2.0", TechCrunch, printed from the Internet <http://www.techcrunch.com/2009/10/28/google-redefines-car-gps-navigation-google-maps-navigation-android/>, Oct. 28, 2009, 4 pages.

Bazzi, Issam et al., "Heterogeneous Lexical Units for Automatic Speech Recognition: Preliminary Investigations", Proceedings of the IEEE International Conference on Acoustics, Speech, and Signal Processing, vol. 3, Jun. 5-9, 2000, XP010507574, pp. 1257-1260.

Belvin, Robert, et al., "Development of the HRL Route Navigation Dialogue System", Proceedings of the First International Conference on Human Language Technology Research, San Diego, 2001, pp. 1-5.

Chai et al., "MIND: A Semantics-Based Multimodal Interpretation Framework for Conversational Systems", Proceedings of the International CLASS Workshop on Natural, Intelligent and Effective Interaction in Multimodal Dialogue Systems, Jun. 2002, pp. 37-46.

Cheyer et al., "Multimodal Maps: An Agent-Based Approach", International Conference on Cooperative Multimodal Communication (CMC/95), May 24-26, 1995, pp. 111-121.

El Meliani et al., "A Syllabic-Filler-Based Continuous Speech Recognizer for Unlimited Vocabulary", Canadian Conference on Electrical and Computer Engineering, vol. 2, Sep. 5-8, 1995, pp. 1007-1010.

Elio et al., "On Abstract Task Models and Conversation Policies" in Workshop on Specifying and Implementing Conversation Policies, Autonomous Agents '99, Seattle, 1999, 10 pages.

Kirchhoff, Katrin, "Syllable-Level Desynchronisation of Phonetic Features for Speech Recognition", Proceedings of the Fourth International Conference on Spoken Language, 1996, ICSLP 96, vol. 4, IEEE, 1996, 3 pages.

Kuhn, Thomas, et al., "Hybrid In-Car Speech Recognition for Mobile Multimedia Applications", Vehicular Technology Conference, IEEE, Jul. 1999, pp. 2009-2013.

Lin, Bor-shen, et al., "A Distributed Architecture for Cooperative Spoken Dialogue Agents with Coherent Dialogue State and History", ASRU'99, 1999, 4 pages.

Lind, R., et al., The Network Vehicle—A Glimpse into the Future of Mobile Multi-Media, IEEE Aerosp. Electron. Systems Magazine, vol. 14, No. 9, Sep. 1999, pp. 27-32.

Mao, Mark Z., "Automatic Training Set Segmentation for Multi-Pass Speech Recognition", Department of Electrical Engineering, Stanford University, CA, copyright 2005, IEEE, pp. I-685 to I-688.

O'Shaughnessy, Douglas, "Interacting with Computers by Voice: Automatic Speech Recognition and Synthesis", Proceedings of the IEEE, vol. 91, No. 9, Sep. 1, 2003, XP011100665. pp. 1272-1305.

Reuters, "IBM to Enable Honda Drivers to Talk to Cars", Charles Schwab & Co., Inc., Jul. 28, 2002, 1 page.

Turunen, "Adaptive Interaction Methods in Speech User Interfaces", Conference on Human Factors in Computing Systems, Seattle, Washington, 2001, pp. 91-92.

Vanhoucke, Vincent, "Confidence Scoring and Rejection Using Multi-Pass Speech Recognition", Nuance Communications, Menlo Park, CA, 2005, 4 pages.

Weng, Fuliang, et al., "Efficient Lattice Representation and Generation", Speech Technology and Research Laboratory, SRI International, Menlo Park, CA, 1998, 4 pages.

Wu, Su-Lin, et al., "Incorporating Information from Syllable-Length Time Scales into Automatic Speech Recognition", Proceedings of the 1998 IEEE International Conference on Acoustics, Speech and Signal Processing, 1998, vol. 2, IEEE, 1998, 4 pages.

Wu, Su-Lin, et al., "Integrating Syllable Boundary Information into Speech Recognition", IEEE International Conference on Acoustics, Speech, and Signal Processing, ICASSP-97, 1997, vol. 2, IEEE, 1997, 4 pages.

Zhao, Yilin, "Telematics: Safe and Fun Driving", IEEE Intelligent Systems, vol. 17, Issue 1, 2002, pp. 10-14.

Davis, Z., et al., A Personal Handheld Multi-Modal Shopping Assistant, IEEE, 2006, 9 pages.

\* cited by examiner

US 9,898,459 B2

INTEGRATION OF DOMAIN INFORMATION INTO STATE TRANSITIONS OF A FINITE STATE TRANSDUCER FOR NATURAL LANGUAGE PROCESSING

CROSS REFERENCE TO RELATED APPLICATION

This application claims the benefit of U.S. Provisional Patent Application Ser. No. 62/051,292 filed Sep. 16, 2014 entitled "INTEGRATION OF DOMAIN INFORMATION INTO STATE TRANSITIONS OF A FINITE STATE TRANSDUCER FOR NATURAL LANGUAGE PROCESSING", the entirety of which is incorporated herein by reference.

FIELD OF THE INVENTION

The invention relates to systems and methods of integrating domain information into state transitions of a Finite State Transducer for natural language processing.

BACKGROUND OF THE INVENTION

Semantic parsing is a process that transforms natural language (NL) input (e.g., sentences, phrases, words, etc.) into computer executable complete meaning representations (MRs) for domain-specific applications, where Meaning Representation Language (MRL) for an application is assumed to be present. Part of the job of semantic parsing is to extract the domain information from a natural language input. For example, if a user queries "find Dixie's Grill," a semantic parser should be able to determine that the user is looking for a restaurant named "Dixie's BBQ."

Semantic parsing is a difficult computational problem. One reason for this is that NL inputs and their meanings may have many-to-many relationships. For example, multiple NL inputs may correspond to a single meaning, a single input could have different meanings (usually users intend to convey a single meaning, so system would need to interact with/learn from the user to disambiguate them), and other many-to-many relationships can occur. Conventional semantic parsers typically are inefficient at disambiguating a potential meaning of an NL input, particularly when the criteria size is large. Furthermore, conventional semantic parsers typically have sub-optimal matching capabilities. As a result, conventional semantic parsers do not scale well for complicated information domains and often produce inaccurate MRs.

Other types of information retrieval systems may scale better than some semantic parsers. For example, conventional Inverted-Index-Search ("IIS") information retrieval systems, which are premised on keyword search, typically employ indexed information domains to facilitate efficient search. However, these systems typically ignore structural information (e.g., semantic structural information) that may be included in an NL input and therefore may not account for a user's intent. For example, for an NL input "find bus stop near VOICEBOX," the results from a conventional IIS information retrieval system may relate to documents (e.g., webpages) that contain the keywords in the search input, without semantic information to help determine the intent of the user. Thus, the results may be irrelevant to the user's intended request.

Thus, what is needed is to improve semantic parsing for enhanced user intent recognition, improve the relevancy of information retrieval results, and improve recognition of NL, whether uttered, typed, or otherwise provided by a user. These and other problems exist.

SUMMARY OF THE INVENTION

The invention addressing these and other drawbacks relates to systems and methods of integrating domain information into state transitions of a Finite State Transducer ("FST") for natural language processing. A system may integrate semantic parsing and information retrieval from an information domain to generate an FST parser that represents the information domain. The FST parser may include a plurality of FST paths, at least one of which may be used to generate a meaning representation from a natural language input (e.g., a natural language string based on a natural language utterance or other input). As such, the system may perform domain-based semantic parsing of a natural language input to generate robust meaning representations (e.g., search queries, commands, etc.) using domain information. By generating more relevant meaning representations, results obtained by executing the meaning representations may be more accurately aligned with the user's intent.

The system may be applied to a wide range of natural language applications that use natural language input from a user. For example, and without limitation, applications of domain-based semantic parsing may include natural language interfaces to computing systems, communication with robots in natural language, personalized digital assistants, question-answer query systems, and/or other natural language processing applications.

To generate an FST parser, the system may obtain a semantic grammar and then structure a given FST path based on the semantic grammar. An FST path may therefore have a semantic structure based on the semantic grammar. The semantic grammar may include various criteria. For example, a semantic grammar "find <business names>" includes an action criterion ("find") and a subject criterion ("<business names>"). Other semantic grammars having additional and/or different criteria may be used as well.

An FST path may include a plurality of states, where at least two states are separated by a state transition. An initial state transition may be associated with an action criterion such as "find." The system may add subsequent state transitions to an FST path based on an information domain. For example, subsequent state transitions may be associated with a token (e.g., word) that appears in an entry of an information domain. For an FST parser that represents an information domain related to businesses, a state transition from one state to another state may be associated with a token (e.g., word) that is part of a business name. Other tokens in the business name may be associated with other state transitions, thus growing the FST path.

For example, an entry "Burnstead Construction Inc." may include tokens "Burnstead," "Construction," and "Inc." Each token may be associated with a state transition. For example, the token "Burnstead" may yield an FST path corresponding to "find Burnstead." Other tokens of the entry may be used as well, either to add to the existing FST path or create a new FST path. For instance, another token "Construction" may result in an FST path corresponding to "find Burnstead Construction." The system may generate an FST path that includes some or all tokens in a given entry, and may generate one or more FST paths for each entry of an information domain. The system may also generate different FST paths for different permutations of an entry in an information domain. For example, one FST path may correspond to "find Construction Burnstead Inc." while another FST path may correspond to "find Burnstead Construction Inc." Still other FST paths may omit certain tokens. For example, such an FST path may correspond to "find Burnstead Inc." The system may repeat these operations until all entries in the information domain are similarly processed into respective FST paths. The FST parser may therefore be representative of an information domain.

The system may associate a token appearing in an information domain with a weight based on its frequency of appearance in the information domain and/or other domains. For example, the system may associate a weight with a token in proportion to a frequency of the token's appearance in an information domain. In a particular example, the token "Construction" may be weighted differently (e.g., less or more depending on the weighting system) than "Burnstead" if "Construction" appears in various business names but "Burnstead" appears only in one business name. As such, a state transition associated with a token may be weighted accordingly.

The system may score an FST path based on cumulative weights associated with its state transitions. For example, the system may score an FST path by summing the weights associated with state transitions in the FST path. The system may use the score to determine whether a given FST path should be used to generate a meaning representation for a given natural language input. For example, the system may use the FST parser to determine a best FST path (or n-best FST paths) by identifying an FST path that is: (1) associated with tokens that have (exact or fuzzy) matches to tokens of a natural language input, and (2) has the highest (or lowest, depending on the scoring system) score. For instance, if tokens of a natural language input match tokens associated with two or more FST paths, then the FST path having the highest score (or n-highest scores) will be selected. In this manner, a semantic grammar (which is used to structure FST paths of a FST parser) integrated with information retrieval from an information domain (which may be used to weight tokens associated with state transitions of FST paths) may be used to generate more robust, relevant meaning representations.

Once an information domain FST parser has been generated, it may be used to compose an input string FST used to generate a meaning representation from a natural language input. In the example that follows, the natural language input "Coffee find Seattle Best Starbucks Coffee" will be used, although other types of queries/commands/input may be used as well. For example, the system may initialize (e.g., structure) an input FST using the natural language input. The system may compose the input FST based on an information domain FST parser.

The system may find the shortest path (or n-best shortest paths) in the composed input FST, remove redundant epsilon arcs (if any), topologically order the arcs, and generate a parsing result based on the topsorted arcs. Based on the parsing result, an action such as "find" will be mapped its semantic meaning (e.g., "[Action:find]" and the criterion (e.g, "Seattle Best Starbucks Coffee") will be mapped to an entry in an information domain corresponding to businesses, such as "[BusinessName:Best Starbucks Coffee WA]." The system may generate the query string based on the criteria content, i.e., the string between "[" and "]", which is "Best Starbucks Coffee."

In an implementation, the system may compose the input FST with an Information Extraction FST that is used to ignore irrelevant words in the natural language input, add additional words that may relate to the natural language input but were not included in the input, and/or otherwise modify the input FST based on known information. In this manner, the natural language input may be augmented with relevant information (or stripped of irrelevant noise) so that the resulting meaning representation, when executed, causes more relevant results to be returned.

In an implementation, the system may process the input FST to account for phoneme errors. For example, the system may use a phoneme confusion matrix that is trained from speech data to further refine the natural language input to result in a more robust meaning representation that accounts for similar-sounding or otherwise indistinguishable words.

In an implementation, the system may integrate dynamic data, such as information from a personal phonebook, by generating a dynamic data FST based on the dynamic data and insert the dynamic data FST into a dynamic slot of a domain information FST parser. In this manner, dynamic data may be integrated into semantic parsing to generate a meaning representation based on both domain information and dynamic data.

When the input FST is composed (regardless of whether an information extraction FST, a phoneme confusion matrix, or dynamic data is used), the system may find the shortest path (or n-best shortest paths) from the input FST, remove redundant epsilon arcs (if any), and topsort the arcs. The system may calculate the ID of the best-matched path corresponding to an entry in the information domain based on the sum of the weights along the input FST and generate a meaning representation based on the best-matched path.

Accordingly, the system may generate a meaning representation from a natural language input by using tokens that appear in the natural language input (also referred to herein as input tokens) to select a relevant FST path (which was formed using a semantic grammar and tokens that appear in an information domain (also referred to herein an domain tokens to distinguish from input tokens)). The meaning representation may then be used to extract information from and/or execute a command on an appropriate information domain. In this manner, the system may efficiently generate more robust meaning representations that may lead to more accurate, less error-prone, results.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

Figure 1:
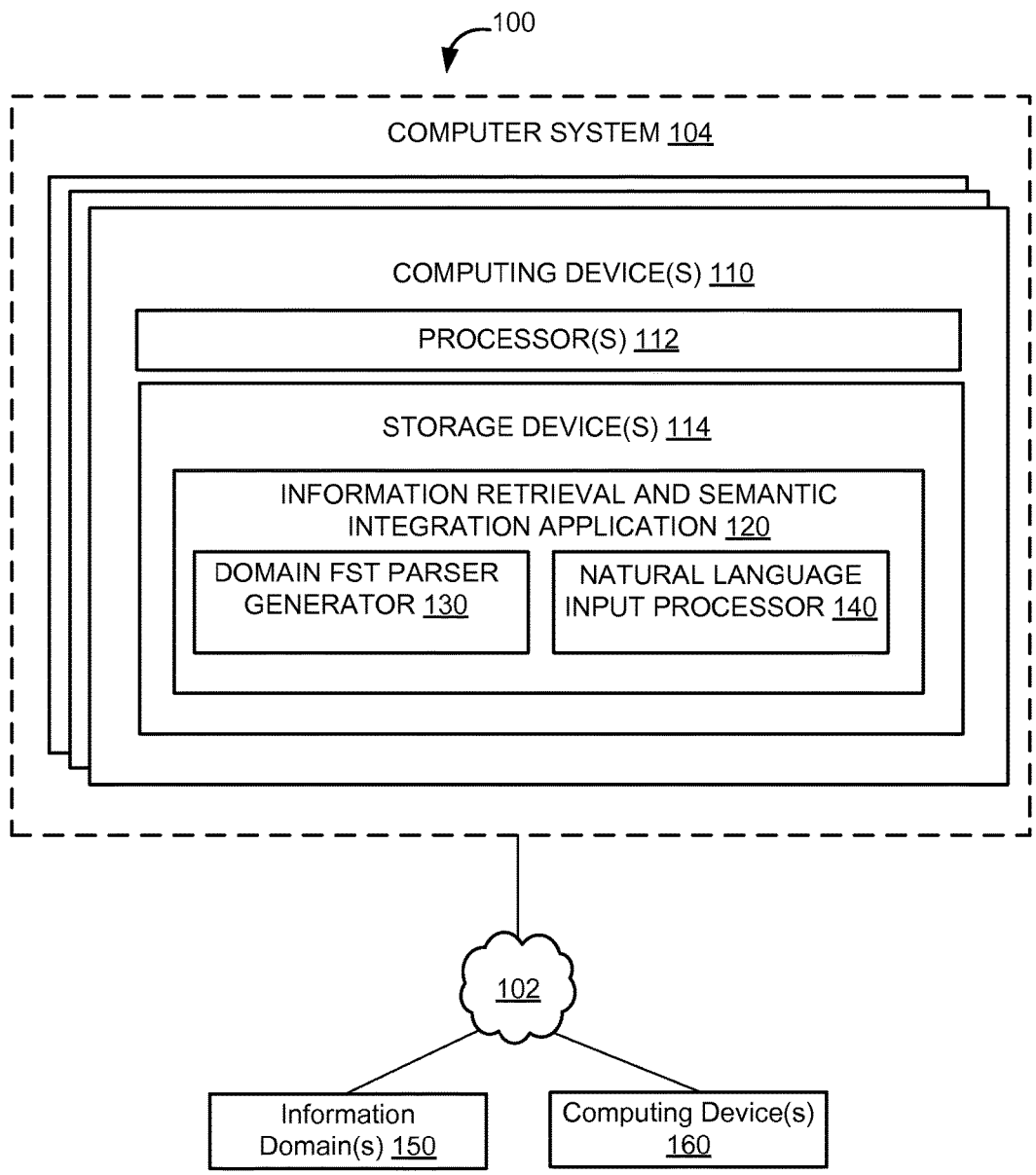
FIG. 1 illustrates a system of integrating domain information into state transitions of a Finite State Transducer for natural language processing, according to an implementation of the invention.

FIG. 1 illustrates a system 100 of integrating domain information into state transitions of a Finite State Transducer for natural language processing, according to an implementation of the invention. A system may integrate semantic parsing and information retrieval from an information domain to generate an FST parser that represents the information domain. The FST parser may include a plurality of FST paths, at least one of which may be used to generate a meaning representation from a natural language input (e.g., natural language utterance and/or other natural language input).

The meaning representation may be used to execute an action (e.g., a search, a command, and/or other action) related to an information domain. As such, in an implementation, the meaning representation is not necessarily a search result itself, but rather a semantically parsed translation of a natural language input that uses domain information to help understand the intent of the natural language input. Thus, the system may receive a user request in the form of a natural language input from a user (which may or may not have been recognized from an utterance), generate a meaning representation as described herein, and execute the meaning representation responsive to the user's request.

Examples of an FST parser are used herein throughout for illustration and not limitation. The principles of integrating semantic parsing and information retrieval may be applied to other semantic parsing systems and other contexts as well.

Other uses of system 100 are described herein and still others will be apparent to those having skill in the art. Having described a high level overview of some of the system functions, attention will now be turned to various system components that facilitate these and other functions.

System 100 may include a computer system 104, one or more information domains 150, one or more computing device(s) 160, and/or other components.

Information Domains

An information domain 150 may include a set of information that includes subject matter that may be searched or otherwise executed on. For example, an information domain 150 may include a listing of businesses, a listing of addresses, a listing of songs, a listing of personal contacts, and/or other corpus of information that may be searched, played or otherwise executed. Each information domain 150 may have its own type of information. For example, one information domain 150 may relate to businesses while another information domain 150 may relate to songs. In an implementation, an information domain 150 may include a combination of different types of information. For example, one information domain 150 may relate to businesses and songs.

An information item in an information domain 150 may be associated with a token or keyword. For example, a listing of businesses may include the name of a business and/or other business-related information. A listing of songs may include a song title, artist name, genre, and/or other song-related information. An information domain 150 may be indexed to facilitate rapid searching of its content, such as its tokens.

Computer System 104

Computer system 104 may include one or more computing devices 110. Each computing device 110 may include one or more processors 112, one or more storage devices 114, and/or other components. Processor(s) 112 may be programmed by one or more computer program instructions, which may be stored in storage device(s) 114.

The one or more computer program instructions may include, without limitation, an information retrieval and semantic integration application 120 ("IRSI application 120"). IRSI application 120 may itself include different sets of instructions that each program the processor(s) 112 (and therefore computer system 104). For example, IRSI application 120 may include a domain FST parser generator 130, a natural language input processor 140, and/or other instructions that program computer system 104. As used herein, for convenience, the various instructions will be described as performing an operation, when, in fact, the various instructions program computer system 104 to perform the operation.

Generating an FST Parser Representative of an Information Domain

Figure 2:
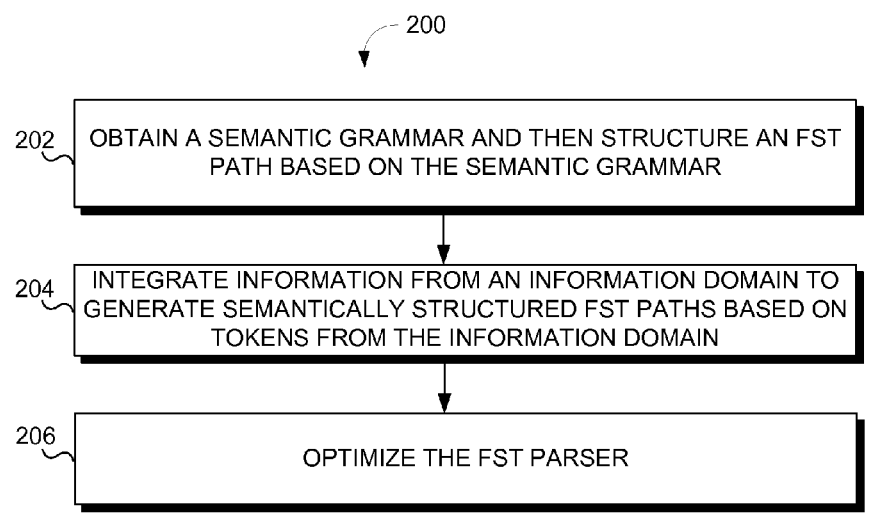
FIG. 2 which depicts a process of generating an FST parser, according to an implementation of the invention.

Domain FST parser generator 130 may generate an FST parser that integrates information retrieval from an information domain 150 and a semantic grammar. For example, FIG. 2 depicts a process 200 of generating an FST parser, according to an implementation of the invention. The various processing operations and/or data flows depicted in FIG. 2 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

Structuring FST Paths of an FST Parser Using a Semantic Grammar

In an operation 202, FST parser generator 130 (or other instructions) may obtain a semantic grammar and structure an FST path based on the semantic grammar. An FST path may include a plurality of states, where at least two states are separated by a state transition. A semantic grammar may include at least an action criterion and a subject criterion. For example, a semantic grammar "find <BusinessNames>" includes an action criterion ("find") and a subject criterion ("<BusinessNames>"), in which an initial state is depicted using bold and a final state is depicted with double circles. Other semantic grammars having additional and/or different criteria may be used as well.

Figure 3:
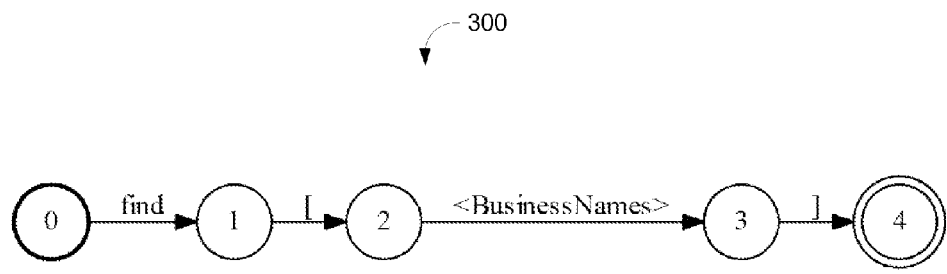
FIG. 3 depicts an FST path structured by a semantic grammar, according to an implementation of the invention.

FST parser generator 130 may structure an FST path using the criteria of the semantic grammar to form state transitions from one state to another state such that each criterion is represented as a node in the FST path. For example, FIG. 3 depicts an FST path 300 structured by a semantic grammar (in the illustrated example: "find <BusinessNames>"), according to an implementation of the invention. A given state (or node 0, 1, 2, 3, 4 as illustrated in FIG. 3) may be transitioned to another state via a state transition, which is illustrated by an arrow (also described herein as an "arc," which may be labeled).

Integrating Domain Information into Semantically Structured FST Paths of an FST Parser In an operation 204, FST parser generator 130 may integrate information from an information domain 150 to generate semantically structured FST paths based on tokens (e.g., words) from the information domain. For example, FST parser generator 130 may add state transitions to a semantically structured FST path based on tokens from an information domain. Subsequent state transitions may be associated with a token that appears in an entry of an information domain 150.

Table 1 illustrates non-limiting examples of entries in an information domain related to businesses. Such an information domain will typically have many more entries (e.g., an entry for each known business), but the illustrated information domain is illustrated with five entries for illustrative purposes. Furthermore, an information domain may include alternative or additional types of information. The following table is therefore included solely to illustrate aspects of the disclosure and will be described in conjunction with FIGS. 4, 5, and 6 that follow.

| entry weight | Entry Full Name |
| --- | --- |
| 3 | Best Starbucks Coffee WA |
| 1 | Burnstead Construction Inc WA |
| 1 | Microsoft WA |
| 1 | Seattle Best Coffee WA |
| 1 | VoiceBox Technologies Inc WA |

For an FST parser representing an information domain illustrated in Table 1, a state transition from one state to another state may be associated with a token that is part of a business name. Other tokens in the business name may be associated with other state transitions, thus growing an FST path that corresponds to an entry in the information domain.

For example, an entry "Burnstead Construction Inc." may include tokens "Burnstead," "Construction," and "Inc." Each token may be associated with a state transition. The token "Burnstead" may yield an FST path corresponding to "find Burnstead." Other tokens of the entry may be used as well, either to add to the existing FST path or create a new FST path. For instance, another token "Construction" may yield an FST path corresponding to "find Burnstead Construction." The system may generate an FST path that includes some or all tokens in a given entry, and may generate one or more FST paths for each entry of an information domain. The system may also generate different FST paths for different permutations of an entry in an information domain. For example, one FST path may correspond to "find Construction Burnstead Inc." while another FST path may correspond to "find Burnstead Construction Inc." The system may repeat these operations until all entries in the information domain are similarly processed into respective FST paths. The FST parser may therefore be representative of an information domain 150.

FST parser generator 130 may associate a token appearing in an information domain with a weight based on its frequency of appearance in the information domain and/or other domains. For example, FST parser generator 130 may associate a weight with a token in proportion to a frequency of the token's appearance in an information domain. In a particular example, the token "Construction" may be weighted differently (e.g., less or more depending on the weighting system) than "Burnstead" if "Construction" appears in various business names but "Burnstead" appears only in one business name.

The token weight may serve to indicate which tokens may be more relevant than others when matching input tokens from an input request (e.g., a user search request) with tokens from an FST path (e.g., so that the relevance of a given FST path to the input tokens may be determined). For example, an FST path having matching tokens that commonly appear in an information domain may be less relevant to an input request than an FST path having matching token that do not commonly appear in the information domain.

FST parser generator 130 may score an FST path based on cumulative weights associated with its state transitions. For example, the system may score an FST path by summing the weights associated with state transitions in the FST path. FST parser generator 130 may use the score to determine a relevance of a given FST path to a given natural language input. For example, the system may use the FST parser to determine a best FST path (or n-best FST paths) by identifying an FST path that is: (1) associated with tokens that have (exact or fuzzy) matches to tokens of a natural language input, and (2) has the highest (or lowest, depending on the scoring system) score. For instance, if tokens of a natural language input match tokens associated with two or more FST paths, then the FST path having the highest score (or n-highest scores) will be selected. In this manner, a semantic grammar (which is used to structure FST paths of a FST parser) integrated with information retrieval from an information domain (which may be used to weight tokens associated with state transitions of FST paths) may be used to generate more robust, relevant meaning representations.

Figure 4:
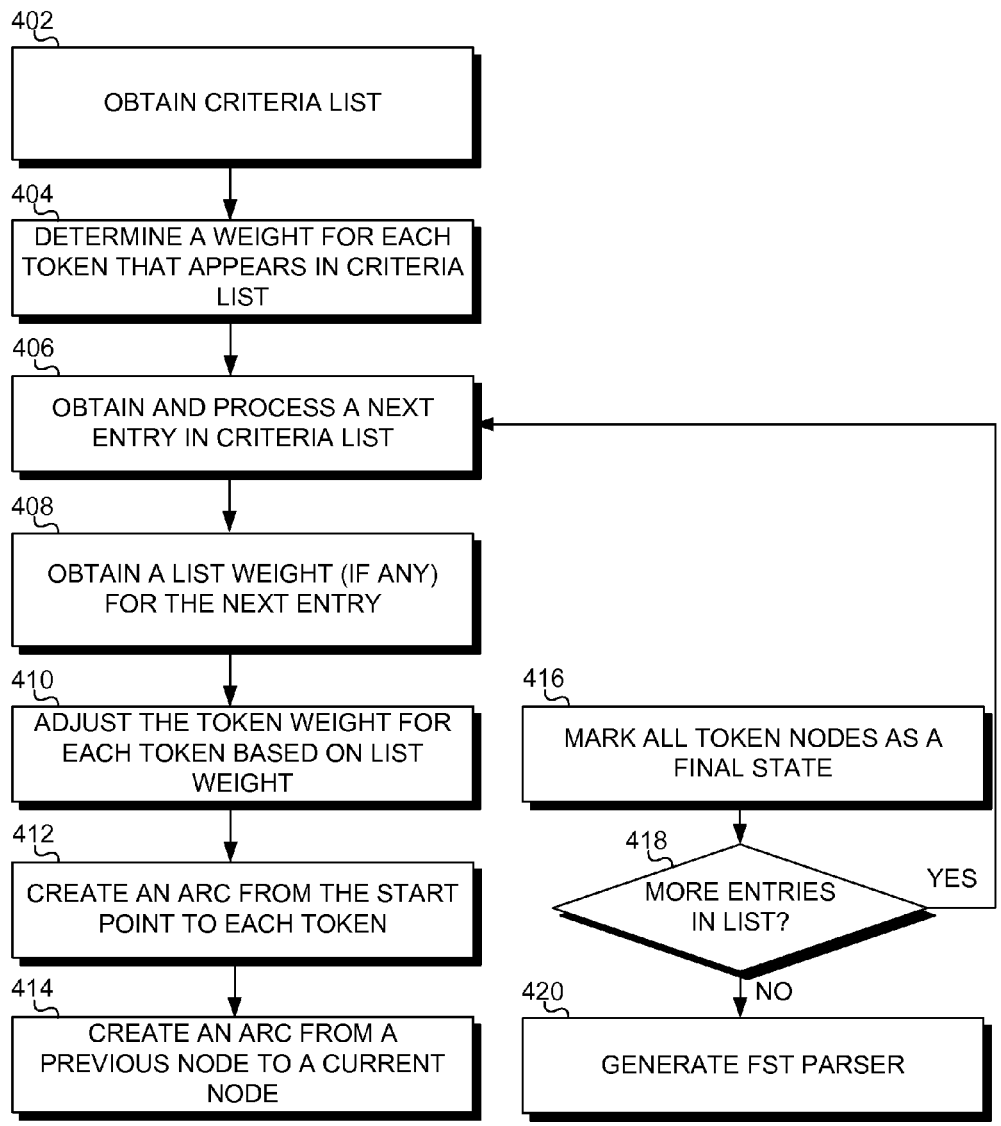
FIG. 4 depicts a process of integrating information from an information domain to generate semantically structured FST paths based on tokens from the information domain, according to an implementation of the invention.

FIG. 4 depicts a process 400 of integrating information from an information domain 150 to generate semantically structured FST paths based on tokens from the information domain, according to an implementation of the invention. Operation 204 illustrated in FIG. 2 may use some or all of the processing operations of process 400 to integrate information from an information domain 150.

In an operation 402, domain FST parser generator 130 may obtain a criteria list, which may include entries in an information domain. For example, domain FST parser generator 130 may obtain the business name entries in the exemplary information domain illustrated in Table 1.

In an operation 404, domain FST parser generator 130 may determine a weight, such as a term frequency inverse document frequency value ("TF-IDF") value, for each token in the criteria list. For example, domain FST parser generator 130 may determine a TF-IDF value for each token that appears in the criteria list, whether in a single entry or multiple entries. As would be appreciated, a more common token (e.g., one that occurs more than another token) may be associated with a lower TF-IDF value while a less common token may be associated with a higher TF-IDF value.

In an operation 406, domain FST parser generator 130 may obtain and process a next entry in the criteria list. For example, once tokens for each entry of an information domain have been assigned a TF-IDF value depending on their appearance in the information domain, domain FST parser generator 130 may iteratively obtain and process a next business name in the information domain.

In an operation 408, domain FST parser generator 130 may obtain a list weight for a given entry (if any). For example, a given business name entry may be weighted more or less heavily than another business name entry.

In an operation 410, domain FST parser generator 130 may determine a token weight for each token in an entry. The token weight may include a TF-IDF value of the token and may be adjusted based on the list weight (if any) for an entry in which the token appears.

In an implementation, each token in each list may have a different weight. For example, a TF-IDF value may be calculated for each token using equation (1):

$$TF-IDF = \frac{\text{number of occurances of } i \text{ in list } j}{\text{document length of list } j} * \quad (1)$$

$$\log \frac{\text{Total number of lists}}{\text{number of lists that contain token } i},$$

wherein:
list$_j$ corresponds to an entry in an information domain (also referred to herein as list entry$_j$);
i=a given token;
document length of list j=$\sqrt[3]{\text{numberofwords}}$;
In an implementation, $F_{1j}$ (the closeness of the candidate i for list entry$_j$) may be calculated using equation (2):

$$F_{ij} = C_1 * (\text{\# of matched tokens}) + C_2 * \sum_{\text{each token } x \text{ in List Entry } i} TFIDF(x, j) + C_3 * (\text{word position metrics}) + C_4 * Weight_j, \quad (2)$$

wherein:
$C_1$, $C_2$, $C_3$, $C_4$ are pre-defined weights; Weight$_j$ is the priori-likelihood for j (e.g., "Starbucks" may be given more weight than "Dixie's BBQ"); and
$C_3$ is 0.

According to equation (2), a higher closeness value indicates a better candidate. Referring to equation (2), "word position metrics" refers to a level of closeness of candidate i to list entry j in terms of word order/position.

In the non-limiting example that follows, the "word position metrics" between "i" and "k" should be 1, because it is an exact match. The "word position metrics" between "i" and "j" should be 0.8, because one word ("wa") is not in the same order between Candidate I and List entry j:
Candidate i: "burnstead construction inc. wa"
List entry j: "wa burnstead construction inc."
List entry k: "burnstead construction inc. wa"
In an implementation, to yield the lowest (positive) value for the best candidate, $F_{1j}$ (the closeness of the candidate j for token i for which the lowest value indicates the best candidate) may be calculated using equation (3):

$$F_{2j} = C_1 * (\text{\# of not matchedtokens}) + C_2 * \Sigma(TFIDF_{max} - tfidf_{ij}) + C_4 * (Weight_{max} - Weight_j) \quad (3),$$

wherein:
$TFIDF_{max}$=the maximum value of all TFIDF values for all tokens in all list entries; and
$Weight_{max}$=the maximum value of all TFIDF values for all tokens in all list entries.

Assuming N is the total number of words in the query string, then:

$$F_{2j} = C_1 * (N - \text{\# of not matched tokens}) + C_2 * \sum TFIDF_{max} - \quad (4)$$
$$C_2 * \sum tfidf_{ij} + C_4 * Weight_{max} - C_4 * Weight_j$$
$$= C_1 * N + C_2 * \sum TFIDF_{max} + C_4 * Weight_{max} -$$
$$C_1 * (\text{\# of not matched tokens}) - C_2 * \sum tfidf_{ij} - C_4 * Weight_j$$
$$= C_1 * N + C_2 * \sum TFIDF_{max} + C_4 * Weight_{max} - F_{1j}.$$

wherein:
$TFIDF_{max}$ is the maximum value of all TFIDF values for all tokens in all list entries;

Weightmax is the maximum value of all weights for all list entries; and

Weightj is the weight for list entry j.

In an implementation, the token weight may be further weighted based on a list weight (if any) associated with the entry.

In an operation 412, domain FST parser generator 130 may create an arc from the start point (e.g., a command state or node) to each token such that a state transition from the start point to a given token node (e.g., state associated with a token) is associated with the token weight.

In an operation 414, domain FST parser generator 130 may create another arc from a previous token node (if it exists) to the current token node such that a state transition from the previous token node to the current token node is associated with the token weight.

In an operation 416, domain FST parser generator 130 may mark all token nodes as a final state.

In an operation 418, domain FST parser generator 130 may determine whether more entries in the list are to be processed. If more entries are to be processed, domain FST parser generator may return to operation 406. Otherwise, FST parser generator 130 may complete generation of the FST parser in an operation 420.

Figure 5:
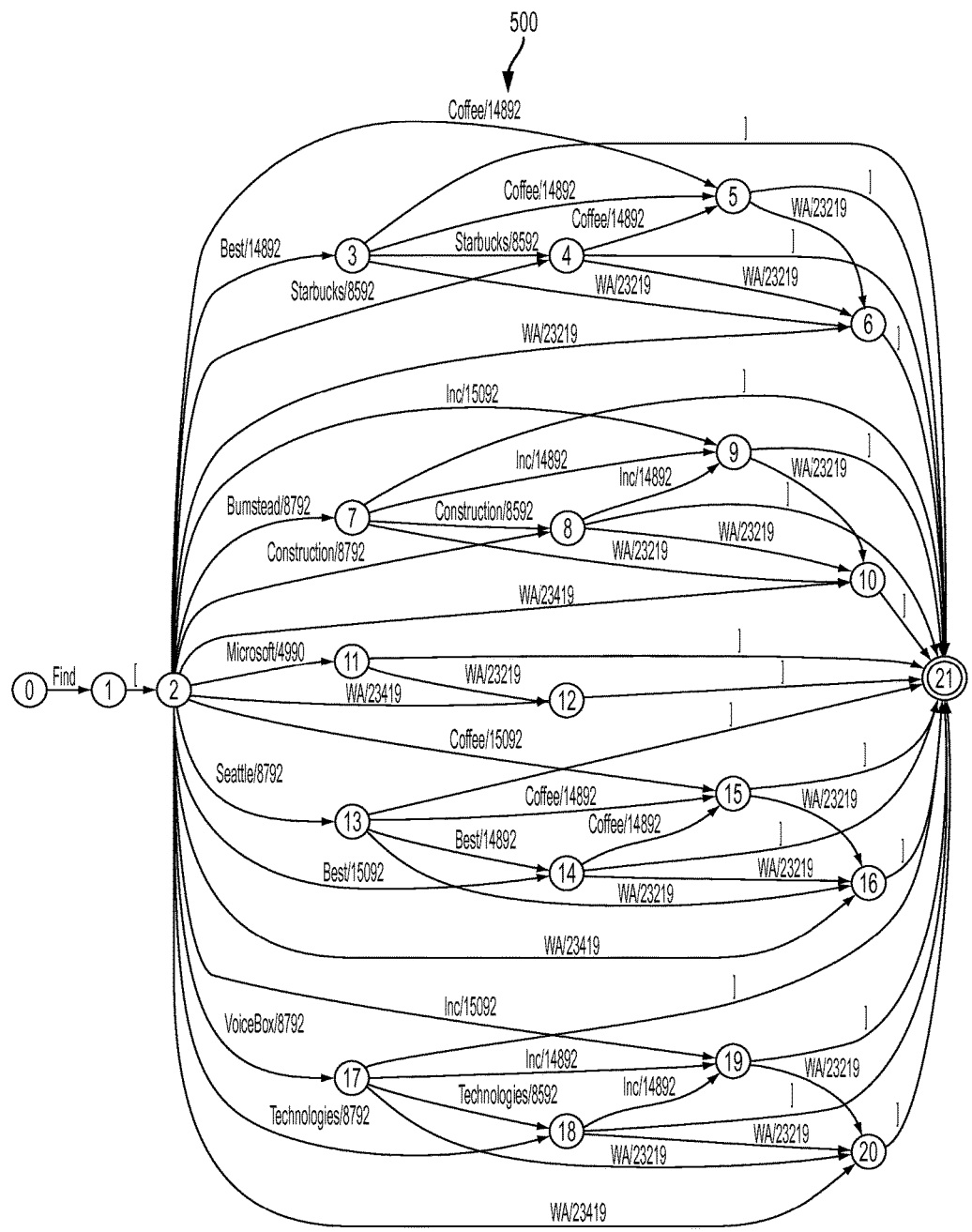
FIG. 5 depicts an FST parser structured by a semantic grammar and expanded using information and weights from an information domain, according to an implementation of the invention.

FIG. 5 schematically depicts an FST parser 500 structured by a semantic grammar and expanded using information and weights from an information domain, according to an implementation of the invention. FST parser 500 schematically depicts results from the processing operations of process 400 using the information domain illustrated in Table 1. FST parser 500 may include a plurality of nodes (0-21). A given node (0-21) may be associated with a token, an arc, and/or an end point. Each node (0-21) may be part of an FST path.

Optimizing an FST Parser

Returning to FIG. 2, in an operation 206, domain FST parser generator 130 may optimize the FST parser generated from operation 204 (additional details of which were described with respect to process 400 in FIG. 4).

For example, domain FST parser generator 130 may determinize an FST parser such that each state may have at most one transition with any given input label and empty labels are eliminated. The resulting FST may contain at most one patch matching any given input string, therefore reducing the time and space needed to process the string. Conditions of a determinizable FST include, for example, weakly left divisible semirings, a determinization algorithm can finish on M, all unweighted acceptors are determinizable, all acyclic acceptors are determinizable, not all weighted acceptors or transducers are determinizable, and characterization based on the twins property.

Figure 6:
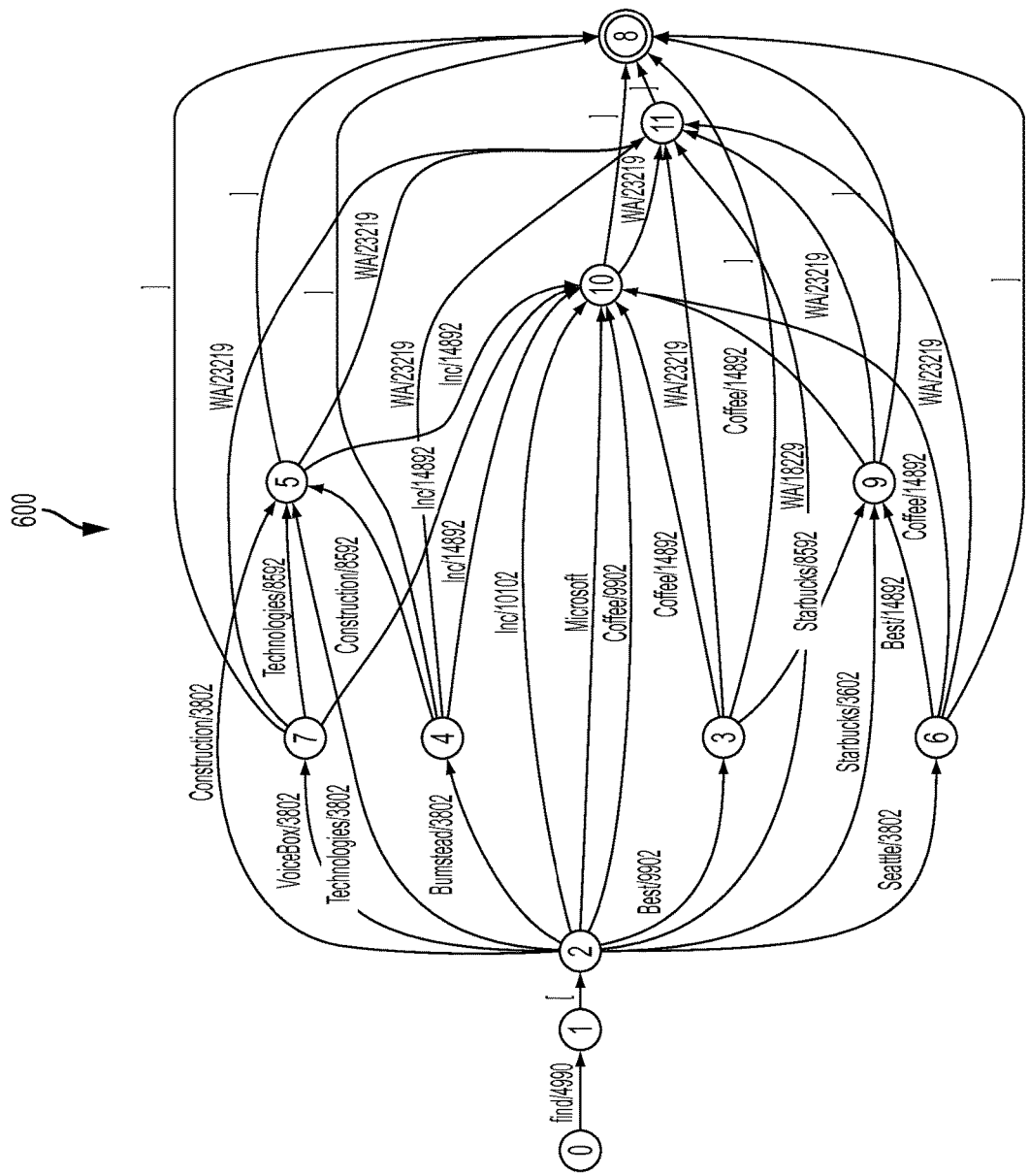
FIG. 6 schematically depicts an optimized version of the FST parser illustrated in FIG. 5, according to an implementation of the invention.

In an implementation, domain FST parser generator 130 may further reduce the size of an FST parser by applying minimization, saving space and processing time. In an implementation, domain FST parser generator 130 may further reduce the size of an FST parser by performing an arc sort, which sorts the arcs in an FST per state. FIG. 6 schematically depicts an optimized version 600 of the FST parser 500 illustrated in FIG. 5, according to an implementation of the invention. As illustrated, optimized version 600 includes only nodes 0-11, in which various nodes and arcs have been removed from FST parser 500 during an optimization process to generate optimized version 600.

Composing a Meaning Representation from a Natural Language Utterance Using the FST Parser In an implementation, natural language input processor 140 may generate a meaning representation from a natural language input by selecting and applying an FST parser, which is generated by FST parser generator 130. The natural language input may include an input string. The input string may have been converted from a user utterance using conventional speech-to-text techniques or may have been input as text from the user. In any event, the natural language input may be processed to generate a meaning representation using an FST parser (e.g., an FST parser generated by domain FST parser generator 130).

Figure 7:
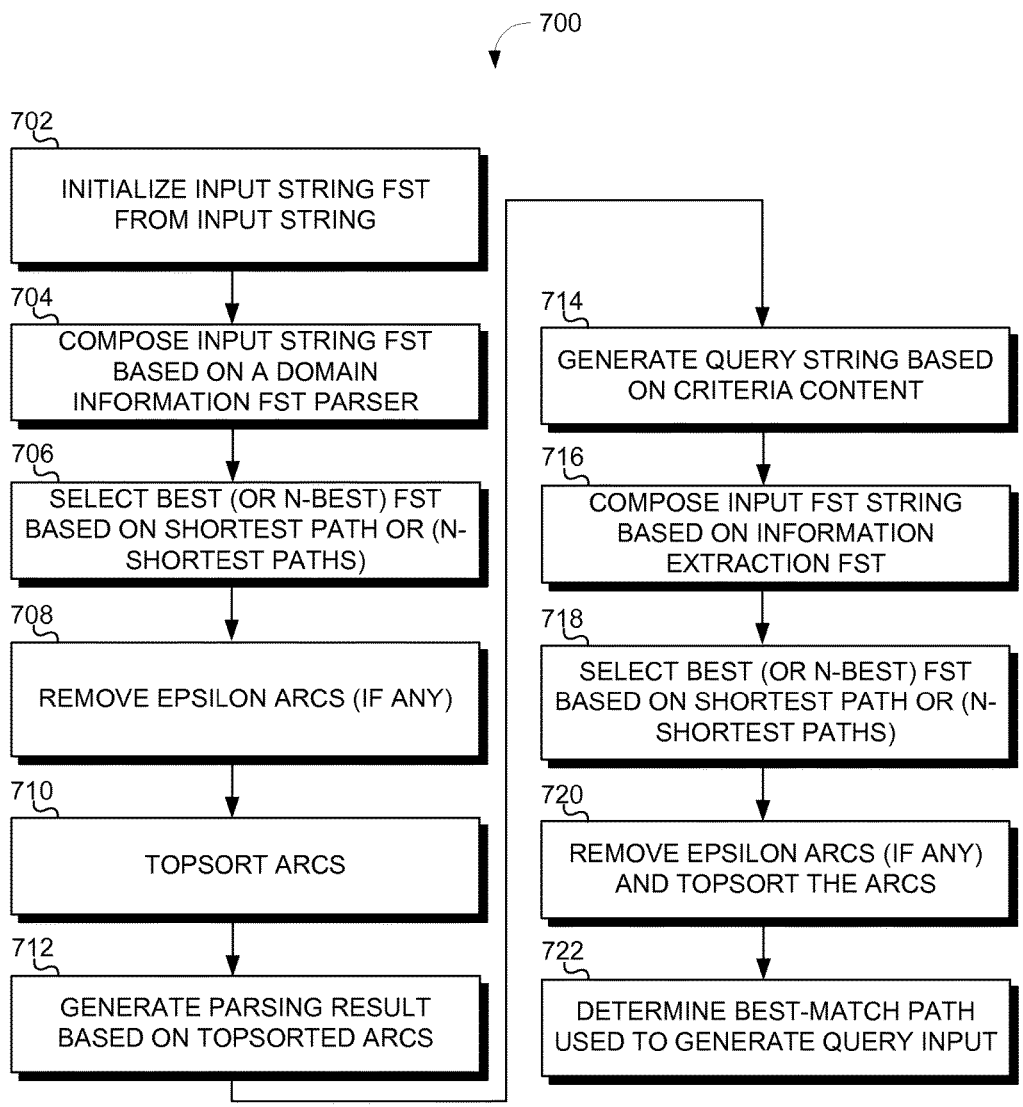
FIG. 7 depicts a process of composing a meaning representation from a natural language input using an FST parser, according to an implementation of the invention.

For example, FIG. 7 depicts a process 700 of composing a meaning representation from a natural language input using an FST parser, according to an implementation of the invention.

In an implementation, in an operation 702, natural language input processor 140 may initialize (e.g., structure) an input string FST using the input string. For example, for each word in the query string, natural language input processor 140 may:

add an arc from a current node (corresponding to a given word of the input string being processed) to a next node depending on whether the given word matches with a word from an information domain. For example, natural language input processor 140 may add one arc from a current node to a next node with an input label being the word ID, an output label being the word ID, and a weight being 0. This arc means there is no cost when the input word is matched. Natural language input processor 140 may add one arc from a current node to a next node with an input label being the word ID, an output label being epsilon, and a weight being C1. This arc means the cost will be C1 when the input word is not matched.

add one self-loop arc to a current node with an input label being epsilon, an output label being left boundary, and a weight being 0. This arc means the left boundary could happen at any location of the input string without consuming any input label.

add one self-loop arc to next node with input label being epsilon, output label being right boundary, and weight being 0. This arc means the right boundary could happen at any location of the input string without consuming any input label.

Figure 8:
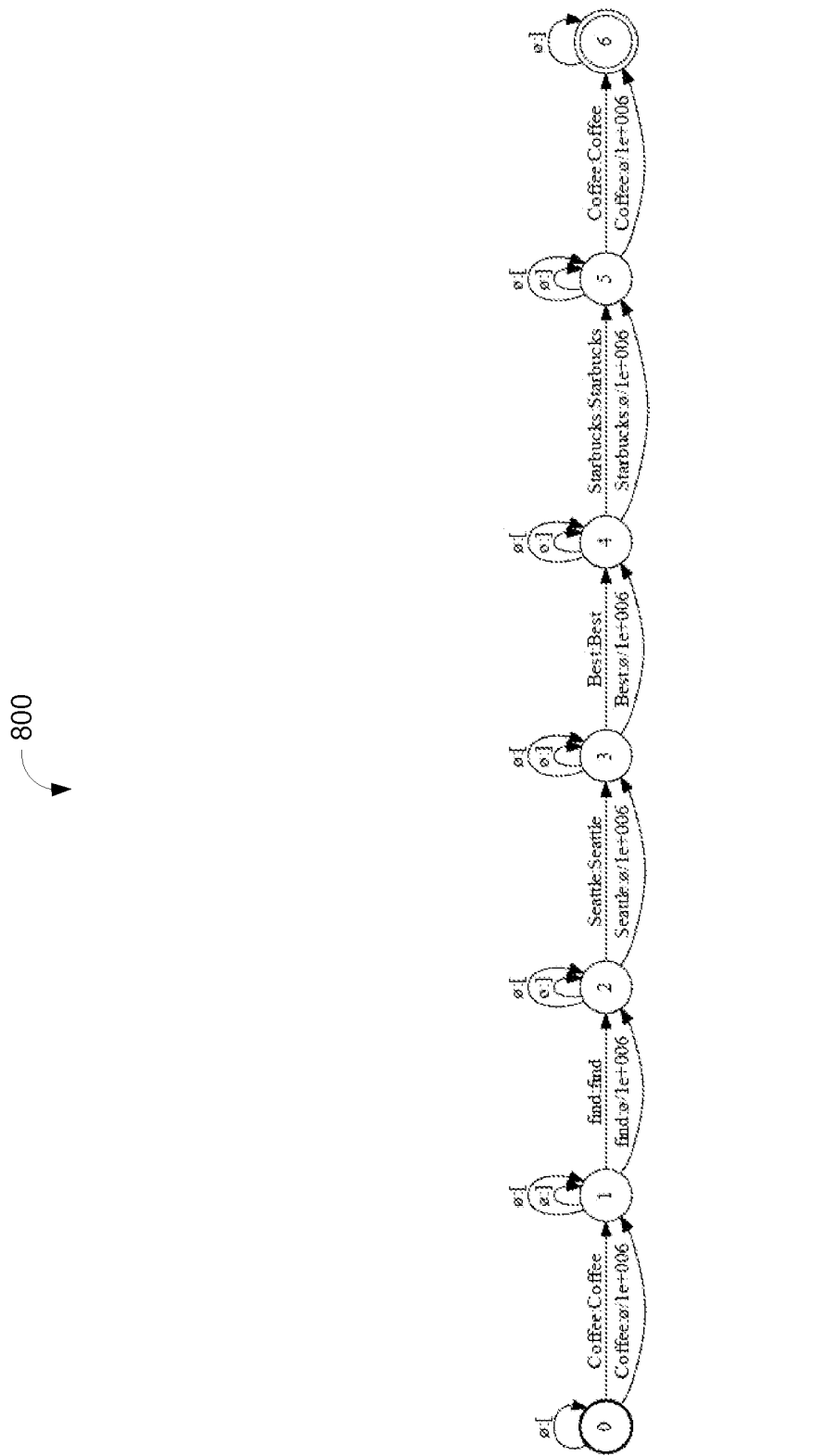
FIG. 8 depicts an input string FST that is initialized, according to an implementation of the invention.

For the last word of the input string, natural language input processor 140 may set the last node as the final state. FIG. 8 depicts an input string FST (having nodes 0-8) that is initialized according to operation 702 if the input query string is "Coffee find Seattle Best Starbucks Coffee," according to an implementation of the invention.

Figure 9:
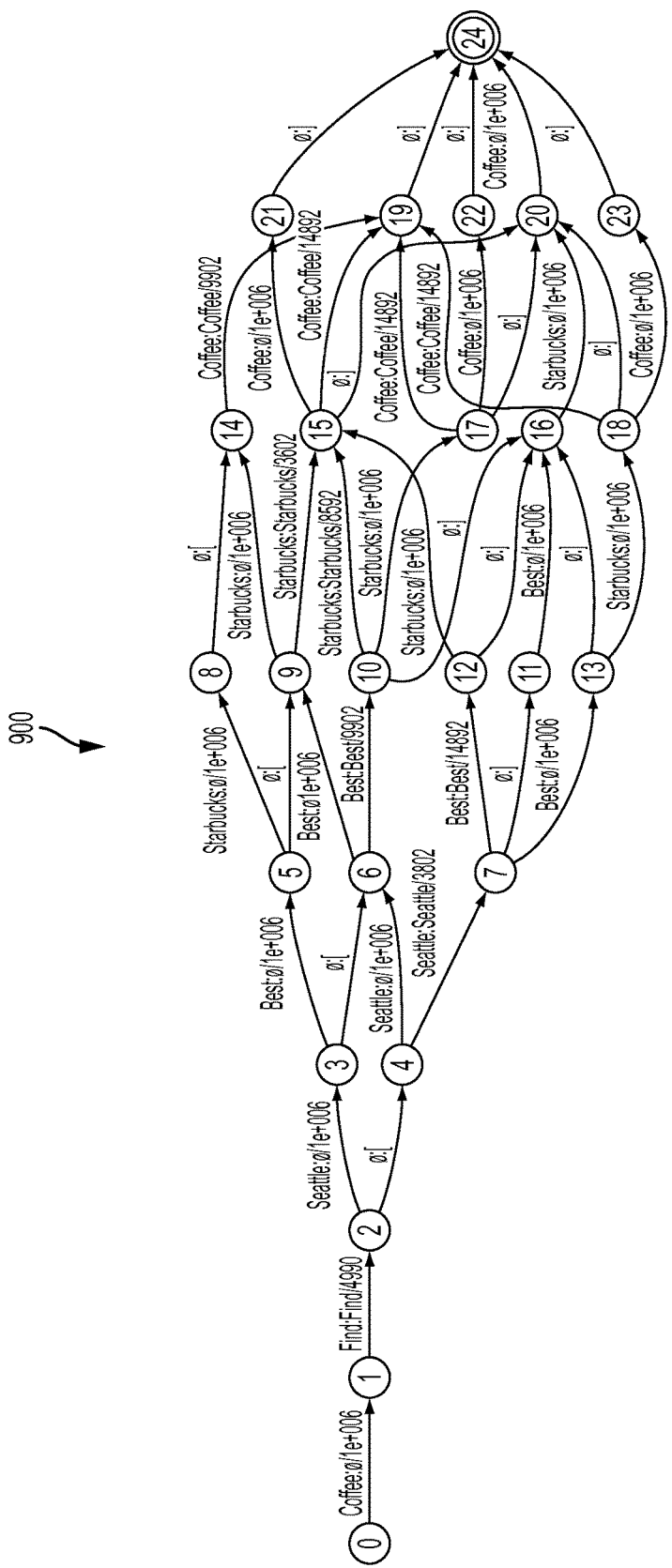
FIG. 9 depicts an input string FST that is composed using a domain information FST parser, according to an implementation of the invention.

In an operation 704, natural language input processor 140 may compose the input FST based on an information domain FST parser (e.g., an FST parser generated by domain FST parser generator 130). FIG. 9 depicts an input string FST 900 that is composed using a domain information FST parser, according to an implementation of the invention. Input string FST 900 is composed in operation 704 using, for example, a domain information FST parser that is based on Table 1 (e.g., FST parser 500 or FST parser 600). For example, an output of the domain information FST parser may be used as in put to FST 900.

Figure 10:
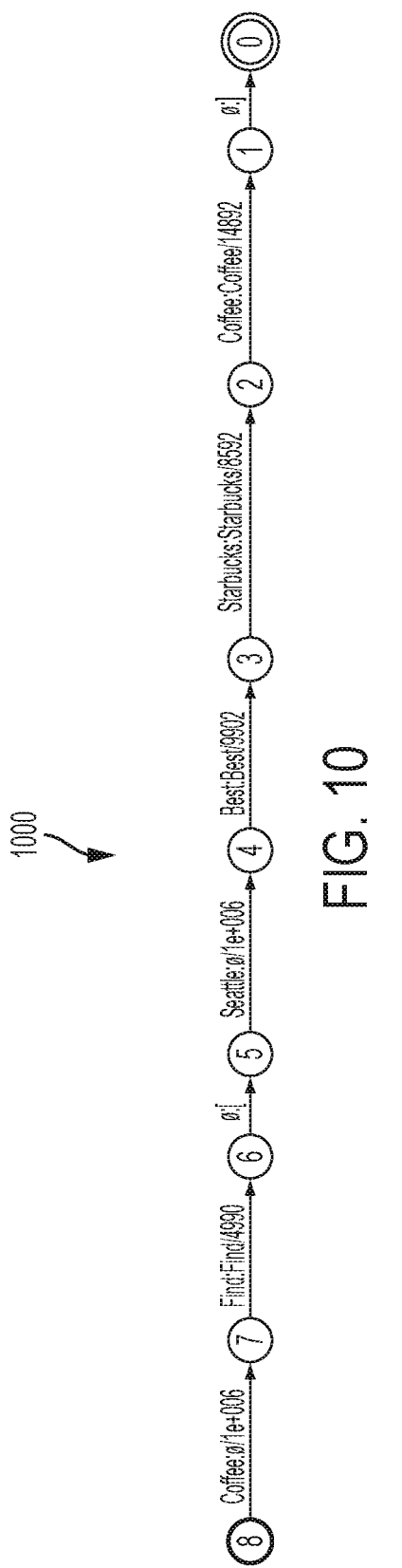
FIG. 10 depicts a 1-best FST selected using the input string FST, according to an implementation of the invention.

In an operation 706, natural language input processor 140 may find the shortest path (or n-best shortest paths) in the composed input FST. FIG. 9 depicts an input string FST 900 (having nodes 0-24) that is composed using a domain information FST parser, according to an implementation of the invention. FIG. 10 depicts a 1-best FST 1000 (having nodes 0-8) selected using the input string FST, according to an implementation of the invention.

In an operation 708, natural language input processor 140 may remove redundant epsilon arcs (if any).

In an operation 710, natural language input processor 140 may topologically order (i.e., "topsort") the arcs.

In an operation 712, natural language input processor 140 may generate a parsing result based on the topsorted arcs. For example, for the following represent an input, parsing result, and weight:

| Input: | Coffee find | Seattle Best Starbucks Coffee |
| Parsing Result: | find | [Best Starbucks Coffee] |
| Weight: | 0 | 148.92 85.92 148.92 |

Based on the parsing result, "find" will be mapped its semantic meaning (e.g., "[Action:find]" the string "Seattle Best Starbucks Coffee" will be mapped to an entry in an information domain, such as "[BusinessName:Best Starbucks Coffee WA]" as it appears in Table 1.

In an operation 714, natural language input processor 140 may generate the query string based on the criteria content, i.e., the string between "[" and "]", which is "Best Starbucks Coffee."

Figure 11:
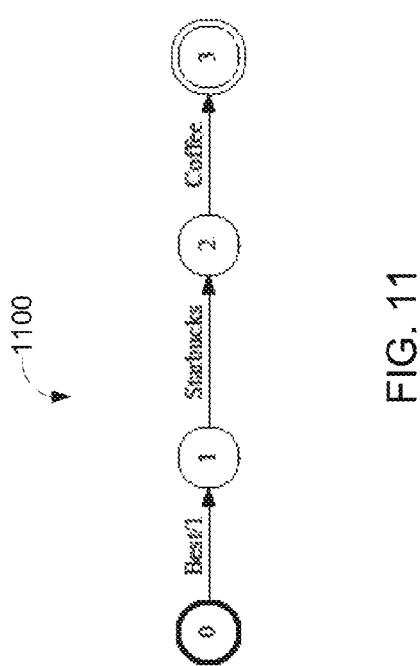
FIG. 11 depicts an input FST composed with an information extraction FST, according to an implementation of the invention.
Figure 12:
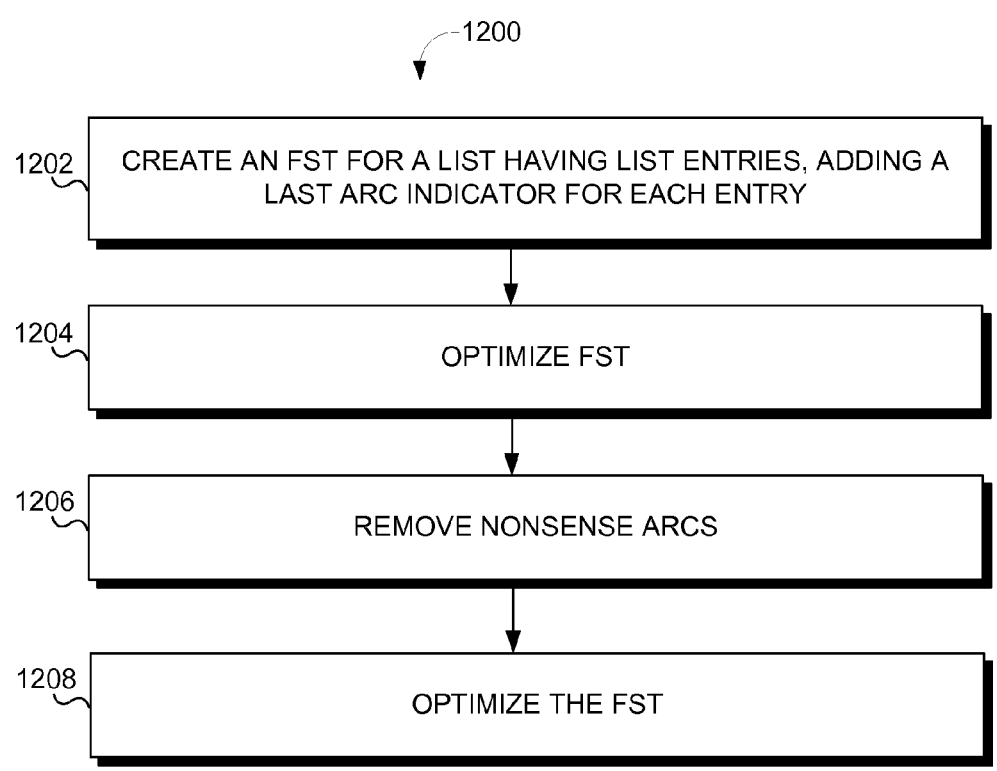
FIG. 12 depicts a process of generating a domain information extraction FST, according to an implementation of the invention.

In an operation 716, natural language input processor 140 may compose the input FST with the Information Extraction FST (the generation of which is illustrated with respect to FIG. 12). FIG. 11 depicts an input FST 1100 (having nodes 0-24) composed with an information extraction FST, according to an implementation of the invention.

In an operation 718, natural language input processor 140 may find the shortest path (or nbest shortest paths) from the input FST (e.g., input FST 1100).

In an operation 720, natural language input processor 140 may remove redundant epsilon arcs (if any) and topsort the arcs.

In an operation 722, natural language input processor 140 calculate the ID of the best-matched path corresponding to an entry in the information domain based on the sum of the weights along the FST. The query input may be generated based on the best-matched path. In some implementations, by selecting the best-matched path (and corresponding entry in the information domain), natural language input processor 140 may ignore words in the input string that may be irrelevant to the information domain while using words in the input string that are relevant to the information domain to formulate a meaning representation that, when used to obtain information from the information domain, will result in more relevant results.

Generating an Domain Information Extraction FST

In an implementation, natural language input processor 140 may generate a domain information extraction FST to obtain detailed information related to an input string. For example, a domain information extraction FST may be used to ignore irrelevant ("noise") words, add relevant words that are likely related to the input string but have not been included in the input string, and/or otherwise use domain information to fine tune an input string (such as by obtaining a full title of a song when only a portion of the song title is included in the input string).

In another example, the following illustrates an input, a parsed input without domain information extraction, and a parsed input with domain information extraction:

| Input: | find | Cavanaugh Rd Normal Town Pennsylvania |
| After parser FST: | find | [Cavanaugh Rd Pennsylvania] |
| After Extraction FST: | find | [Cavanaugh Rd Normalville Pennsylvania] |

In the foregoing example, input to the Extraction FST is "Cavanaugh Rd Pennsylvania", the output is "Cavanaugh Rd Normalville Pennsylvania," where the city name "Normalville" is added to fine tune the input.

In some implementations, natural language input processor 140 may extract (and add to an input) only the best matched information, instead of N-best matches. In other implementations, natural language input processor 140 may extract n-best matches using an inverted-index-search approach.

FIG. 12 depicts a process 1200 of generating a domain information extraction FST, according to an implementation of the invention.

In an operation 1202, natural language input processor 140 may create an FST for the list, adding a last arc with a last arc indicator (e.g., "list_N," where "N" corresponds to a list entry number that is incremented with each list entry) for each entry in the list.

In an operation 1204, natural language input processor 140 may optimize the FST, such as by removing epsilons (if any), performing determinization, and/or other performing other optimizations.

In an operation 1206, natural language input processor 140 may remove the non-sense arcs from start state to end state directly. For each arc with input label being real words, natural language input processor 140 may remove its weights. For each arch with input label being list_N, for each pair of states, only keep only one outbound arc (leaving the state) which has the smallest weight or which has the smallest ID when they have the same weights, change the input label to <epsilon> and set the weight as the "N" (the number ID of the list).

In an operation 1208, natural language input processor 140 may optimize the FST by removing epsilons (if any), performing determinization, performing minimization, and/or performing other operations.

In an implementation, natural language input processor 140 may use the FST to return the numeric ID of a best matched list as the weight given an input string.

Grammar to FST Conversion

Figure 13:
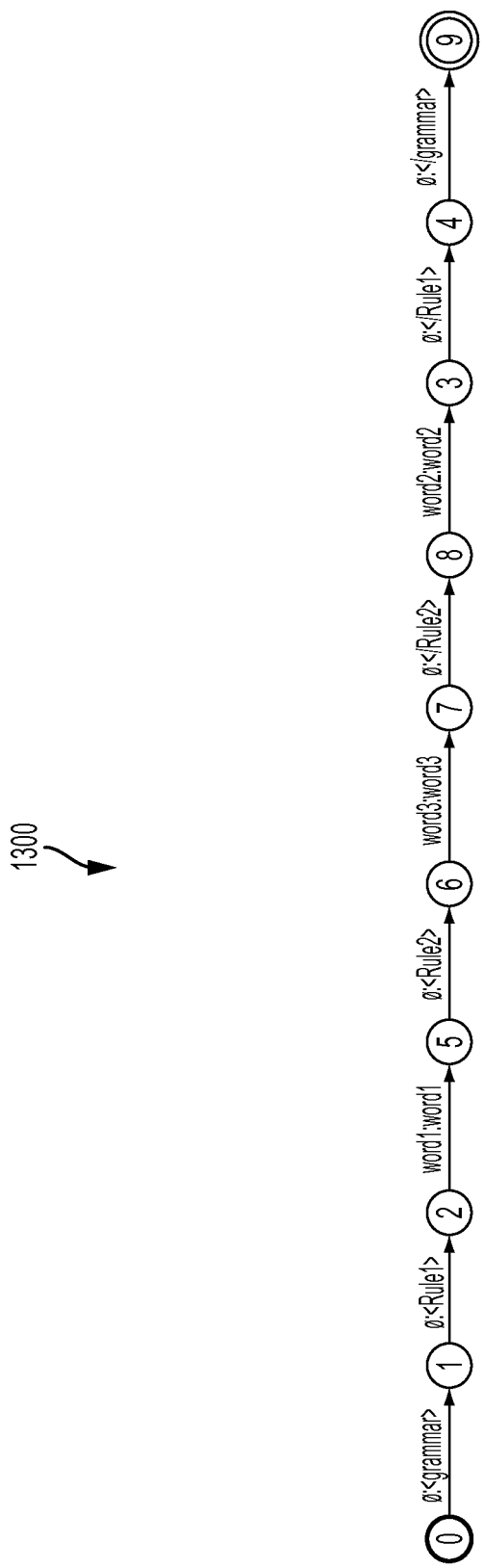
FIG. 13 depicts an FST that expands every possible FST path at the terminal level, according to an implementation.

In an implementation, the system may apply an FST only once, generating an FST such that the FST expands every possible FST path at the terminal level. FIG. 13 depicts an FST 1300 (having nodes 0-9) that expands every possible FST path at the terminal level, according to an implementation of the invention. FST 1300, as illustrated, is constructed based on the following grammar:

public $Rule1=word1 $Rule2 word2
protected $Rule2=word3

In the illustrated example, in order to show the rule information in the parse result, the system may create transitions such as "ϵ:rule_beginning" and "ϵ:rule_end".

Matching Variable Text Using Wildcards

A natural language input may include variable text that may include different words and meanings. In these instances, the system may need to process such variable text to understand how to generate an input query from the natural language input. The system may do so using wildcards. For example, in a natural language input that takes the form of "text $text_body to $person_name," the variable text $text_body and $person_name may include any word or words.

The system may introduce a wildcard (e.g., a special word "_vbt_wild_card_") that can match any word. For example, the foregoing example, with wildcard added, may be represented as:

```
public $Text=
text $text_body to $person_name;
protected $text_body=
_vbt_wild_card_ <1->;
protected $person_name=
_vbt_wild_card_ <1->;
```

Figure 14:
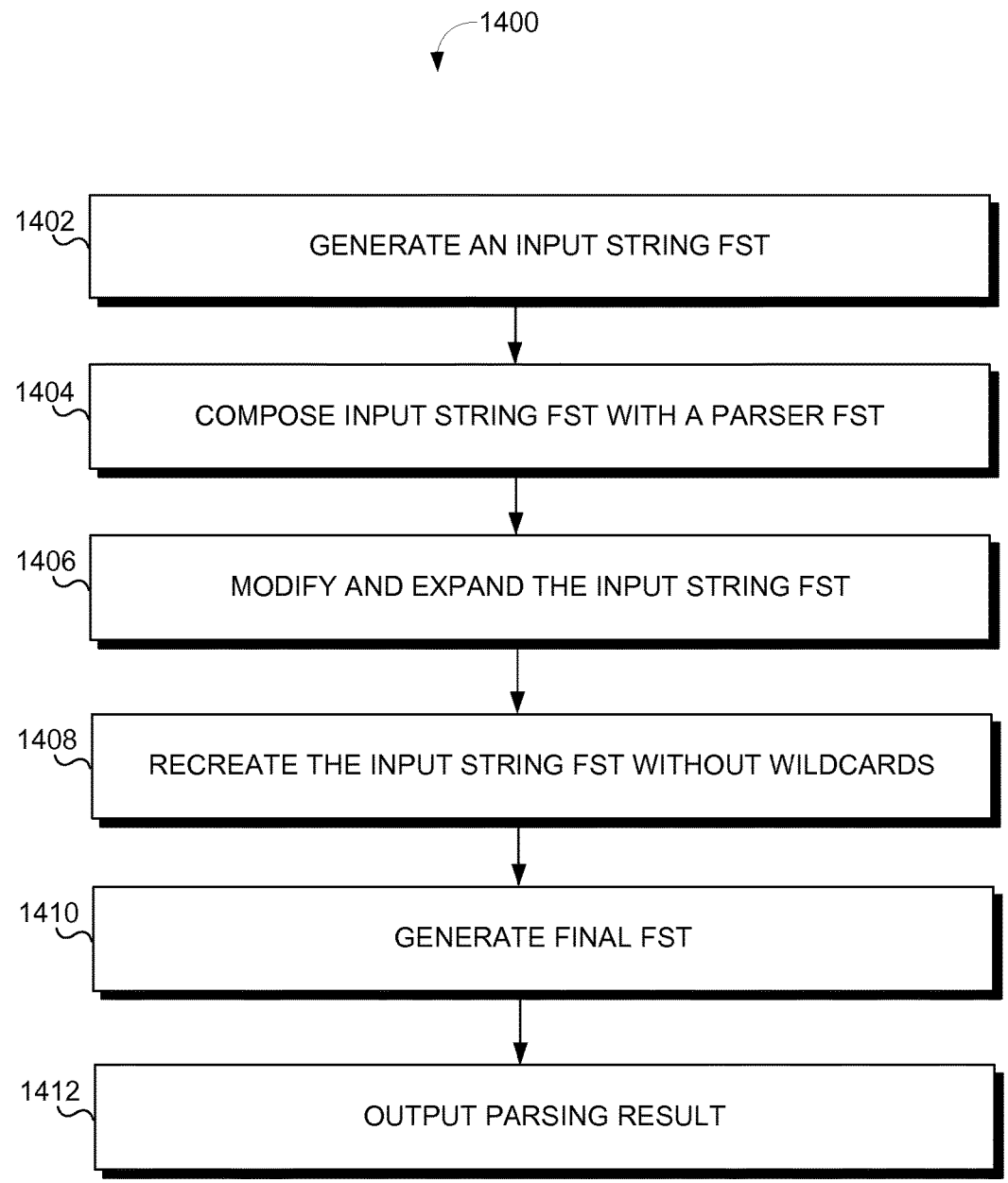
FIG. 14 depicts a process of using wildcards to process a natural language input having variable text, according to an implementation of the invention.

In the description of FIGS. 14-19 that follows, the natural language input of "text lunch together to min tang" will be used by way of illustration and not limitation. FIG. 14 depicts a process 1400 of using wildcards to process a natural language input having variable text, according to an implementation of the invention.

Figure 15:
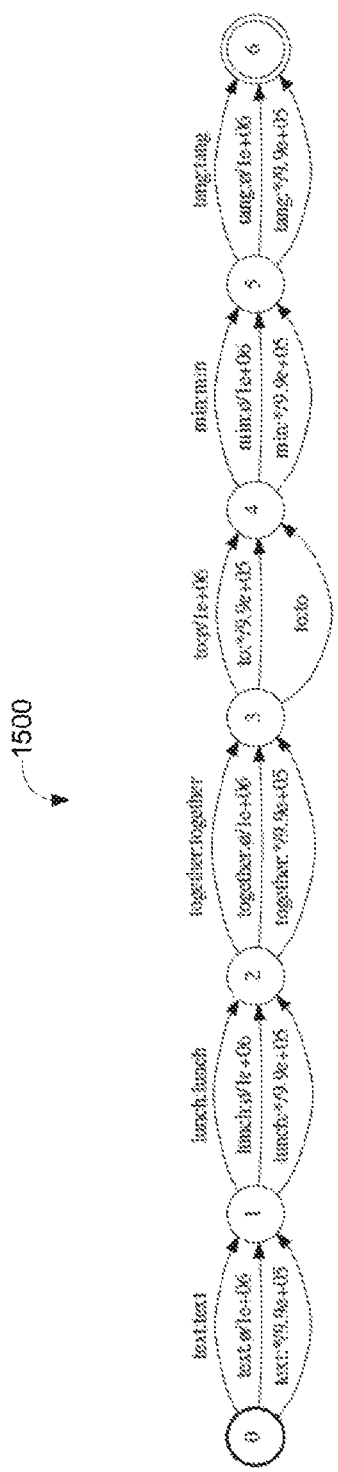
FIG. 15 illustrates an input FST generated for an input string in which state transitions and a temporary symbol table are generated, according to an implementation of the invention.

In an operation 1402, an input string FST may be generated for an input string (e.g., a natural language input string). For each word in the input string, three state transitions may be generated: (1) W:W/0, (2) W:ε/$C_1$, and (3) W:*/$C_1$-$C_2$. A temporary symbol table may also be created, which stores the index of out-of-vocabulary words (e.g., words that do not appear in an information domain). In this case, it contains the following words "lunch", "together", "min" and "tang". In an implementation, the life cycle of the temporary symbol table is only one session. FIG. 15 illustrates an input FST 1500 (having nodes 0-6) generated for an input string in which state transitions and a temporary symbol table are generated, according to an implementation of the invention. For example, input FST 1500 may be generated based on operation 1402.

Figure 16:
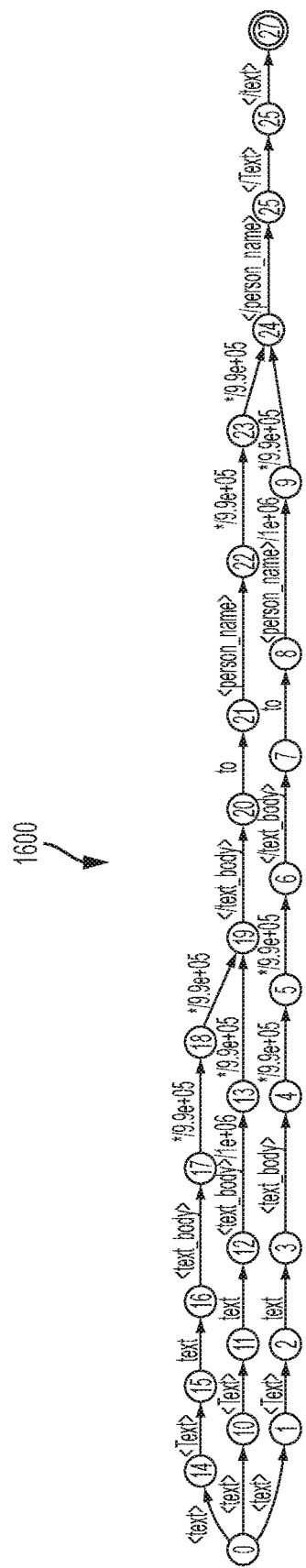
FIG. 16 illustrates an example of an input string FST composed with an FST parser, according to an implementation of the invention.

In an operation 1404, the input FST may be composed with a FST parser (e.g., a FST parser generated by domain FST parser generator 130). In an implementation, project to output label may be performed, epsilons may be removed, and the shortest path may be found. FIG. 16 illustrates an example of an input string FST 1600 (having nodes 0-27) composed with an FST parser according to an implementation of the invention. For example, input string FST 1600 may be composed based on operation 1404.

In an operation 1406, input string FST 1600 may be modified and expanded. For example, for each transition:
If the output label w is not a terminal, change transition from w:w to 0:w;
If the output label w is a terminal;
If w is the wildcard symbol, expand it to multiple transitions;
Otherwise keep the transition as w:w.

Figure 17A:
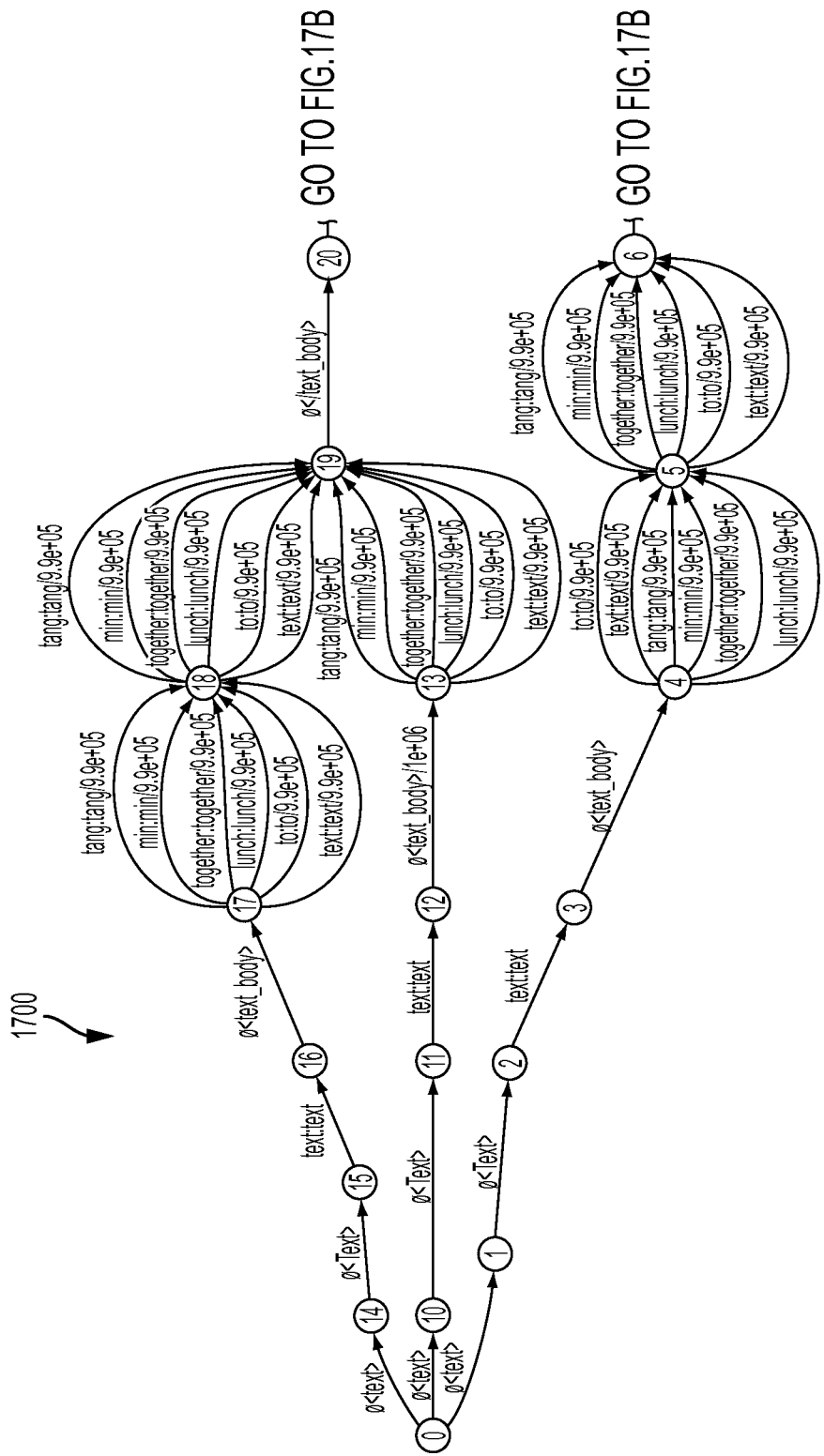
FIG. 17A depicts a portion of a modified and expanded input string FST, according to an implementation of the invention.
Figure 17B:
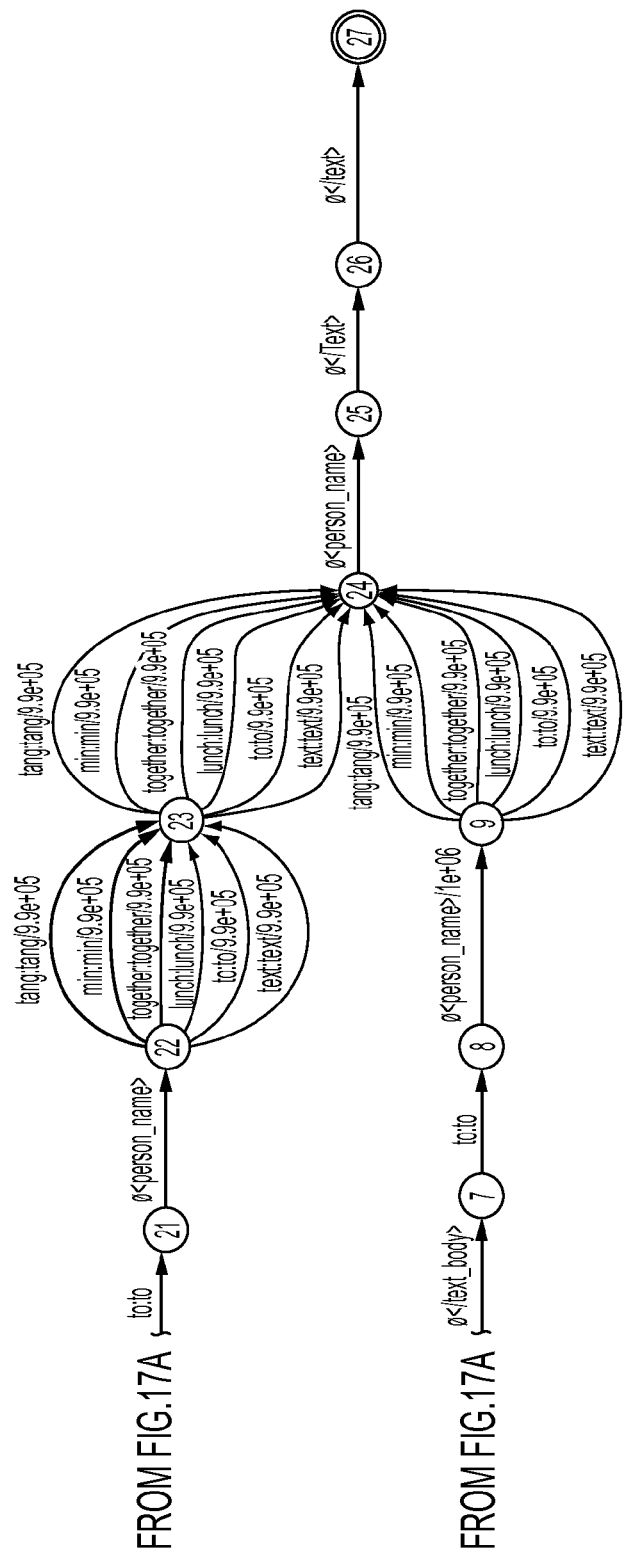
FIG. 17B depicts another portion of the modified and expanded input string FST, according to an implementation of the invention.

FIGS. 17A and 17B together depict a modified and expanded input string FST 1700 (having nodes 0-27), according to an implementation of the invention.

Figure 18:
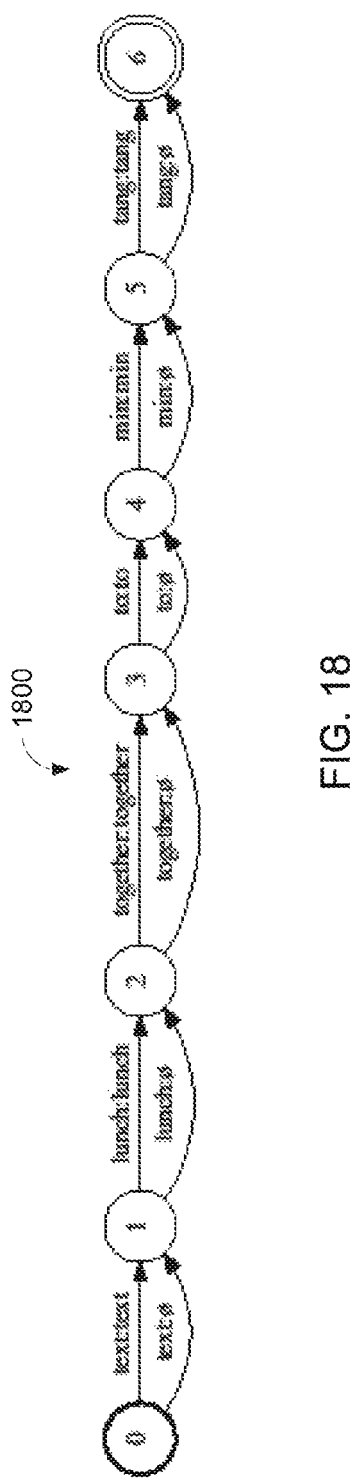
FIG. 18 depicts a recreated input string FST, according to an implementation of the invention.

In an operation 1408, the input string FST may be recreated without wildcards (since such wildcards are accounted for in operation 1406). FIG. 18 depicts a recreated input string FST 1800 (having nodes 0-6), according to an implementation of the invention. For example, recreated input string FST 1800 may be generated based on operation 1408.

Figure 19:
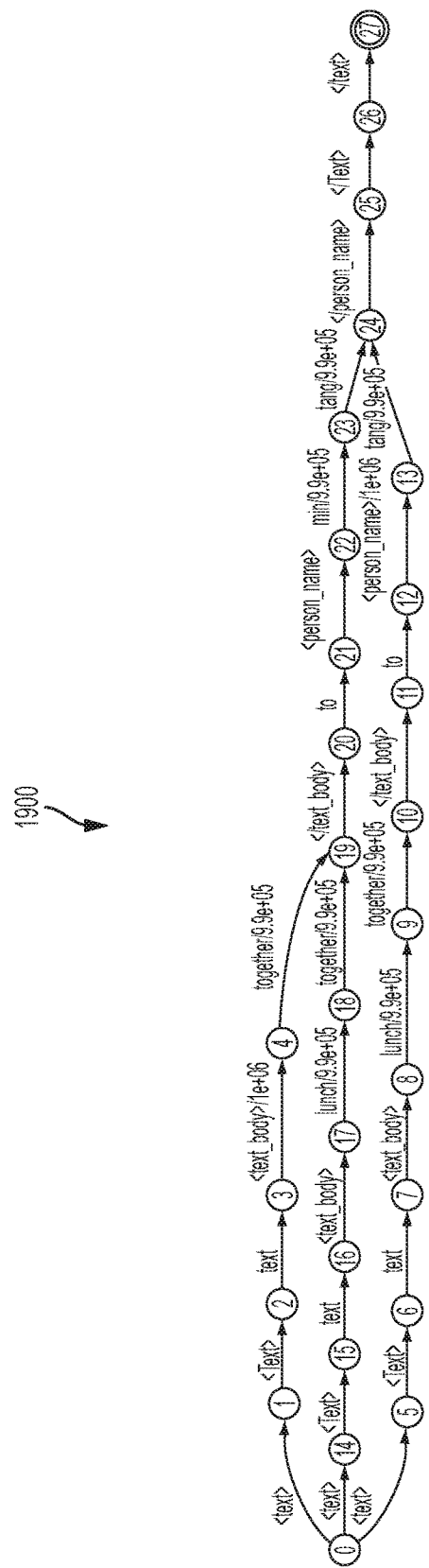
FIG. 19 depicts an input string FST composed from a recreated input string FST and a modified and expanded input string FST, according to an implementation of the invention.

In an operation 1410, a final FST may be generated by composing recreated input string FST 1800 and modified and expanded input string FST 1700, performing project to output label, removing epsilons, and finding the shortest path. FIG. 19 depicts an input string FST 1900 (having nodes 0-27) composed (e.g., using output) from recreated input string FST 1800 and modified and expanded input string FST 1700, according to an implementation of the invention.

In an operation 1412, the parsing result may be output. For example, depth-first-search may be used to traverse the final FST.

For example, in XML format, the parsing result for the above may include:

```
NBest 1: (score = 3960000)
<text>
  <Text>
    text <text_body> lunch together </text_body> to <person_name>
    min tang </person_name>
  </Text>
</text>
NBest 2: (score = 3970000)
<text>
  <Text>
    text <text_body> lunch together </text_body> to <person_name>
    tang </person_name>
  </Text>
</text>
NBest 3: (score = 3970000)
<text>
  <Text>
    text <text_body> together </text_body> to <person_name> min
    tang </person_name>
  </Text>
</text>
```

In JSON format, the parsing result for the above may include:

```
NBest 1: (score = 3960000)
[{"Text":{"text_body":" lunch together ","person_name":" min tang "}}]
NBest 2: (score = 3970000)
[{"Text":{"text_body":" lunch together ","person_name":" tang "}}]
NBest 3: (score = 3970000)
[{"Text":{"text_body":" together ","person_name":" min tang "}}]
```

Other output formats may be used as well to represent and view parsing results. Furthermore, in an implementation, the wildcard could be also supported by using a customized matchers, such as a SigmaMatcher<M> function.

Dynamic Update

In an implementation, instead of matching a predefined information domain or using wildcards, users may wish to query dynamic data that regularly changes or is otherwise frequently updated. For example, dynamic data may include a phone book (e.g., personal contact lists), personal documents, and/or other information that may regularly change.

In an implementation, the use of dynamic data may be supported by defining a dynamic slot in the grammar. For example, a dynamic data FST may be generated based on dynamic data (similar to the manner in which FST parser generator 130 generates an FST parser). The dynamic data FST may be used to fill a dynamic slot in an FST parser.

Table 2 illustrates non-limiting examples of dynamic data entries in a phone book. Such dynamic data will typically have many more entries (e.g., an entry for each contact), but the illustrated dynamic data is illustrated with two entries for illustrative purposes. Furthermore, the dynamic data may include alternative or additional types of information. The following table is therefore included solely to illustrate aspects of the disclosure and will be described in conjunction with FIGS. 20A, 20B, 21A, and 21B that follow.

| Phone_Book | Name | Weight |
|---|---|---|
| Person 1 | min tang | 1 |
| Person 2 | Obama | 1 |

Figure 20A:
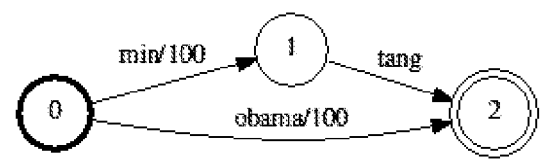
FIG. 20A depicts a dynamic data FST using an exact match, according to an implementation of the invention.
Figure 20B:
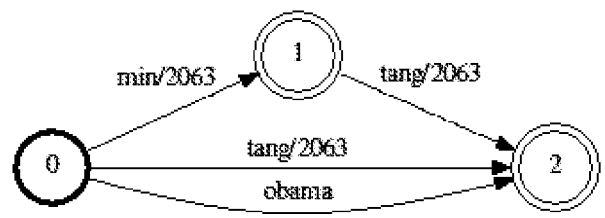
FIG. 20B depicts a dynamic data FST using fuzzy matching, according to an implementation of the invention.

In an implementation, an exact match and/or a fuzzy match may be used when generating a dynamic data FST. FIG. 20A depicts a dynamic data FST 2000A (having nodes 0-2) using an exact match, according to an implementation of the invention. FIG. 20B depicts a dynamic data FST 2000B (having nodes 0-2) using fuzzy matching, according to an implementation of the invention.

Figure 21A:
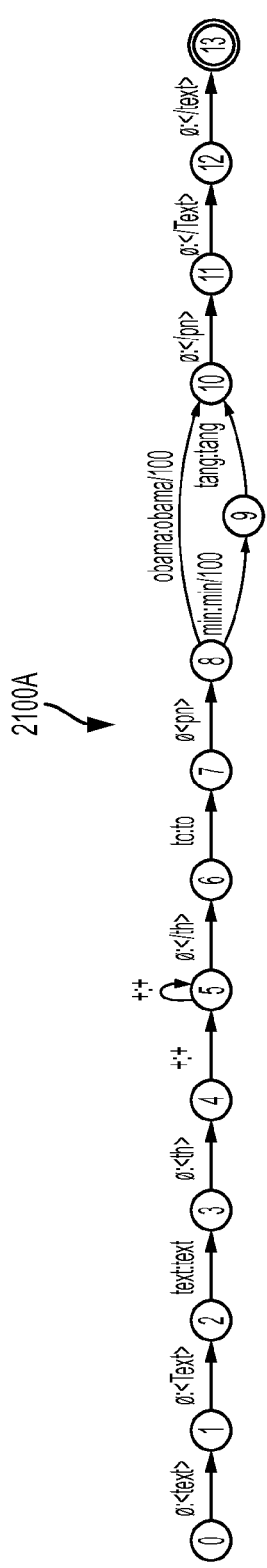
FIG. 21A depicts an FST parser in which a dynamic slot is filled with a dynamic data FST, which uses exact matching, according to an implementation of the invention.
Figure 21B:
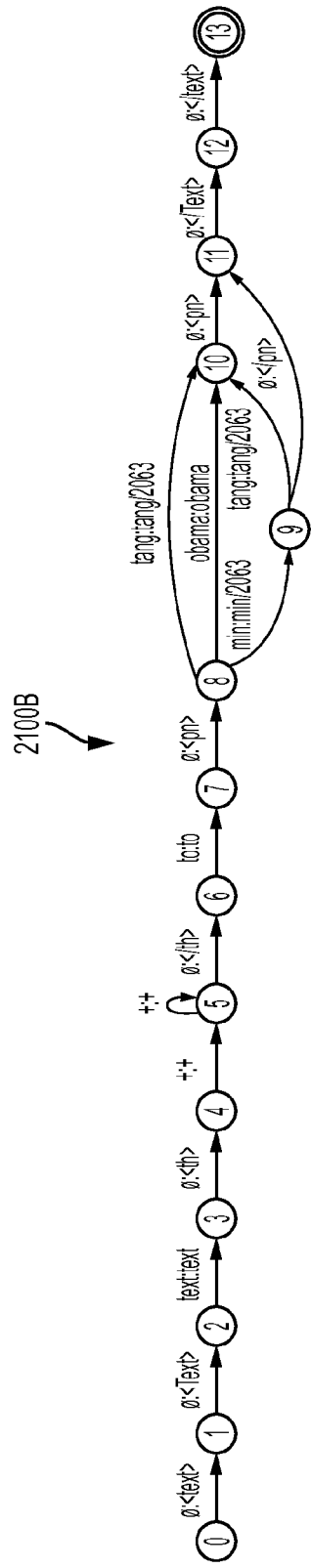
FIG. 21B depicts an FST parser in which a dynamic slot is filled with dynamic data FST, which uses fuzzy matching, according to an implementation of the invention.

In an implementation, a dynamic slot of an FST parser may be filled with dynamic data FST 2000A or dynamic data FST 2000B. FIG. 21A depicts an FST parser 2100A (having nodes 0-13) in which a dynamic slot is filled with dynamic data FST 2000A, which uses exact matching, according to an implementation of the invention. FIG. 21B depicts an FST parser 2100B (having nodes 0-13) in which a dynamic slot is filled with dynamic data FST 2000B, which uses fuzzy matching, according to an implementation of the invention.

An example of an input and parsing output (in JSON format) based on use of dynamic updates using dynamic data includes:

input: text talk to me to min tang
output In JSON format:
NBest 1: (score = 2970100)
[{"Text":{"text_body":" talk to me ","person_name":" min tang "}}]
NBest 2: (score = 2980100)
[{"Text":{"text_body":" talk me ","person_name":" min tang "}}]
NBest 3: (score = 2980100)
[{"Text":{"text_body":" to me ","person_name":" min tang "}}]

Named Entity Extraction Support

In an implementation, FSTs generated herein may integrate character level information in order to help the system determine intent.

For example, for the input: "call (425)123-4567 please," a human being is able to figure out the intent to make a phone call to (425)123-4567. However, in order for a computer to recognize the intent, absent named entity information, wildcards may be required to create a pattern such as "call *". This is not an optimal solution, because the aggressive wildcard would capture noise, such as "please" in the foregoing input example. To avoid abusing the usage of wildcard, we apply Named Entity Extraction ("NER") process before parsing.

For example, assuming that the NER process returns the following NBest result:
NBest 1: call (425)123-4567
NBest 2: call <_vbtPN_>(425)123-4567</_vbtPN_>

An input query FST may be created based on the above NBest result, and then parsed. Using such processing, an output may include, for example:

NBest 1:
[{"CallByNumber":{"PhoneNumber":{"_vbtPN_":"(425) 123-4567"}}}]

Error Tolerance String Matching/Approximate String Matching

Errors in speech recognition may be caused by various error-introducing conditions. Such conditions may include, for example, homonyms, compound words, text normalization, and/or other issues that may cause errors in speech recognition. In the written language, for example, the strings "call (425)123-4567" and "call 4 2 5 1 2 3 4 5 6 7" are two different strings, but they share the same pronunciations (and could have different associated meanings or intent).

In an implementation, to help address the foregoing issues, the system may perform FST parsing at the phoneme level. By performing intent-recognition at the phoneme level, the system may handle sound-alike, homonym, compound-words, text normalization issues, and/or other error-introducing conditions. By injecting an error model (phonetic confusion matrix), the system may be able to make the parsing process robust to ASR errors (to some extent).

Table 3 illustrates a non-limiting example of a phoneme confusion matrix that is trained from speech data. In Table 3, $\epsilon$ stands for "null," which indicates that a corresponding phoneme is deleted or inserted; Pij is the penalty for phoneme i recognized as phoneme j, which case $P_{ii}$ should be 0.

| probability | $\epsilon$ | Phoneme 1 | Phoneme 2 | ... | Phoneme i | ... | Phoneme n |
|---|---|---|---|---|---|---|---|
| $\epsilon$ | $P_{00}$ | $P_{01}$ | $P_{02}$ | | $P_{0i}$ | | $P_{0n}$ |
| Phoneme 1 | $P_{10}$ | $P_{11}$ | $P_{12}$ | | $P_{1i}$ | | $P_{1n}$ |
| Phoneme 2 | $P_{20}$ | $P_{21}$ | $P_{22}$ | | $P_{2i}$ | | $P_{2n}$ |
| ... | | | | | | | |
| Phoneme i | $P_{i0}$ | $P_{i1}$ | $P_{i2}$ | | $P_{ii}$ | | $P_{in}$ |
| ... | | | | | | | |
| Phoneme n | $P_{n0}$ | $P_{n1}$ | $P_{n2}$ | | $P_{ni}$ | | $P_{nn}$ |

To allow any number of phonetic errors may be too computational demanding because. To restrict the size of possible candidates and limit the search space, the system may limit the number of allowed phonetic errors.

Figure 22:
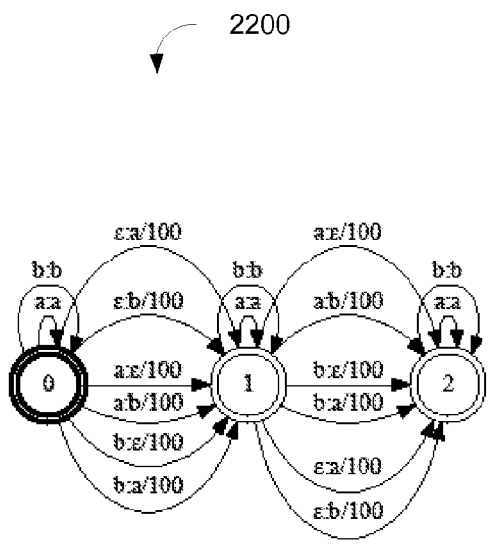
FIG. 22 depicts an FST having two phonemes and allowing up to two errors (including insertions, deletions, and replacements), with a penalty of 100 corresponding to each error, according to an implementation of the invention.

FIG. 22 depicts an FST 2200 (having nodes 0-2) having two phonemes and allowing up to two errors (including insertions, deletions, and replacements), with a penalty of 100 corresponding to each error, according to an implementation of the invention.

Figure 23:
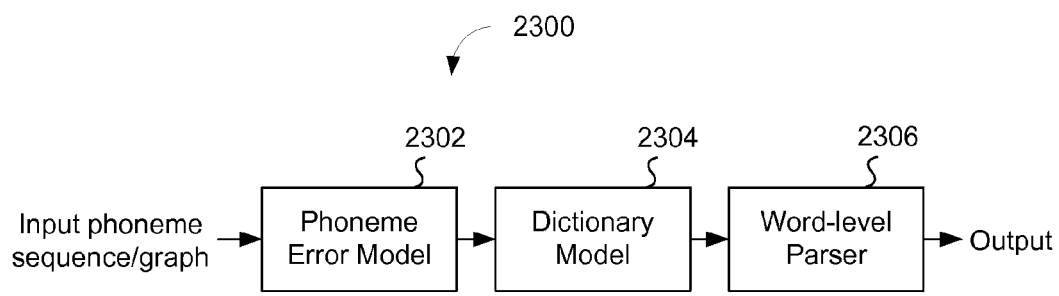
FIG. 23 depicts a flow diagram of FST parsing at the phoneme level, according to an implementation of the invention.

FIG. 23 depicts a flow diagram 2300 of FST parsing at the phoneme level, according to an implementation of the invention. In an implementation, a Phoneme Error Model 2302 may be generated using an input phoneme sequence/graph. Phoneme Error Model 2302 may include an FST that allows a given phoneme to transduce to another given phoneme, with a transition penalty (e.g., Pij defined in Table 3).

In an implementation, a Dictionary Model 2304 may be generated that includes an FST that defines each pronunciation of words in a given path. In an implementation, a Word-level Parser 2306 may be generated that includes an FST parser described herein, which is used to generate an output used for semantic queries.

Examples of System Architectures and Configurations

In an implementation, various system architectures may be used. For instance, some or all instructions of IRSI application 120 or other instructions may execute on different components of system 100. In particular, voice recognition (e.g., speech-to-text), one or more functions/operations of IRSI application 120, and/or other functions/operations described herein may be performed at computing device 110 and/or computing device 160.

For instance, computing devices 110 may include server devices and computing devices 160 may include user devices that connect to the server devices. Other architectures may be used as well.

Although illustrated in FIG. 1 as a single component, computer system 104 may include a plurality of individual components (e.g., computer devices) each programmed with at least some of the functions described herein. In this manner, some components of computer system 104 may perform some functions while other components may perform other functions, as would be appreciated. The one or more processors 112 may each include one or more physical processors that are programmed by computer program instructions. The various instructions described herein are exemplary only. Other configurations and numbers of instructions may be used, so long as the processor(s) 112 are programmed to perform the functions described herein.

Furthermore, it should be appreciated that although the various instructions are illustrated in FIG. 1 as being co-located within a single processing unit, in implementations in which processor(s) 112 includes multiple processing units, one or more instructions may be executed remotely from the other instructions.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 112 may be programmed by one or more additional instructions that may perform some or all of the functionality attributed herein to one of the instructions.

The various instructions described herein may be stored in a storage device 114, which may comprise random access memory (RAM), read only memory (ROM), and/or other memory. The storage device may store the computer program instructions (e.g., the aforementioned instructions) to be executed by processor 112 as well as data that may be manipulated by processor 112. The storage device may comprise floppy disks, hard disks, optical disks, tapes, or other storage media for storing computer-executable instructions and/or data.

The various components illustrated in FIG. 1 may be coupled to at least one other component via a network, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1 and other drawing Figures, different numbers of entities than depicted may be used. Furthermore, according to various implementations, the components described herein may be implemented in hardware and/or software that configure hardware.

The various information domains may be stored in one or more databases such as, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

Computing devices 110, 160 may each include a server computing device, a desktop computer, a mobile device that is generally portable (e.g., a laptop computer, a tablet computer, a "smartphone," etc.), or other computing device that is programmed by IRSI 120 and/or other computer program instructions.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A computer implemented method for integrating domain information and semantic parsing to generate meaning representations from natural language input, the method being implemented on a computer system having one or more physical processors programmed with computer program instructions to perform the method, the method comprising:

receiving, by the computer system, a natural language input of a user comprising a natural language utterance in which at least a first input token has been uttered;

providing, by the computer system, the natural language input to a speech-to-text recognizer;

obtaining, by the computer system, one or more words of the natural language input as an output of the speech-to-text recognition recognizer, wherein the one or more words includes the first input token;

obtaining, by the computer system, a semantic grammar that includes word combinations for intent processing and integrates a plurality of domain tokens relating to an information domain, wherein the semantic grammar integrates the plurality of domain tokens structured into a domain information Finite State Transducer (FST) parser that includes at least a first FST path comprising a first set of domain tokens and a second FST path comprising a second set of domain tokens;

comparing, by the computer system, the plurality of domain tokens that match the first input token;

generating, by the computer system, a first score for the first FST path and a second score for the second FST path based on the comparison;

selecting, by the computer system, the first FST path based on the first score and the second score;

determining, by the computer system, a semantic structure of the one or more words based on the selected first FST path; and generating, by the computer system, a representation of an intention of the user based on the semantic structure, wherein the representation is used to execute a natural language based search request or a natural language based command.

2. The method of claim 1, wherein the first score is based on a first sum of weights of each domain token among the first set of domain tokens and the second score is based on a second sum of weights of each domain token among the second set of domain tokens, and wherein a given weight for a domain token is based on a level of frequency that the domain token appears in the information domain.

3. The method of claim 2, the method further comprising:
initializing an input FST based on the first token and the semantic structure; and composing the input FST based on the first FST path and the second FST path, wherein the first FST path and the second FST path are integrated with the input FST, and wherein the first FST is selected from the input FST.

4. The method of claim 3, wherein selecting the first FST path comprises selecting a shortest path in the input FST.

5. The method of claim 3, wherein comparing the plurality of domain tokens with the first input token comprises:
performing fuzzy or exact matching between the plurality of domain tokens from the information domain and the first token, wherein the plurality of domain tokens comprises fuzzy or exact matches to the first token.

6. The method of claim 1, the method further comprising:
identifying a second token that is relevant to the first token and the information domain, wherein the second token is not initially included in the natural language input; and
adding the second token to the meaning representation.

7. The method of claim 1, wherein the natural language input comprises at least a second token, the method further comprising:
determining that the second token is not relevant to the information domain; and omitting the second token from the meaning representation responsive to the determination that the second token is not relevant.

8. The method of claim 1, the method further comprising:
obtaining a phoneme confusion matrix comprising at least two similar sounding words that are disambiguated based on previous training from one or more user utterances; and
disambiguating the first token based on the phoneme confusion matrix.

9. The method of claim 1, the method further comprising:
obtaining one or more dynamic data tokens from a dynamic data source; and
integrating the one or more dynamic data tokens with the plurality of tokens from the information domain, wherein the meaning representation is determined based on the integrated dynamic data tokens.

10. The method of claim 9, wherein the plurality of domain tokens are structured into a domain information FST parser that includes at least a first FST path comprising a first set of domain tokens and a second FST path comprising a second set of domain tokens, and wherein integrating the one or more dynamic data tokens comprises:
generating a dynamic FST based on the one or more dynamic data tokens; and
inserting the dynamic FST into a slot of the domain information FST parser reserved for dynamic data.

11. The method of claim 1, wherein the computer executable action comprises an execution of:
a natural language-based search request or a natural language-based command.

12. The method of claim 1, wherein the information domain comprises a plurality of entries of searchable information, and wherein retrieving the plurality of domain tokens that match the first token comprises:
determining at least one entry, which includes the plurality of domain tokens, that is likely being searched for based on the first token.

13. A system for integrating domain information and semantic parsing to generate meaning representations from natural language input, the system comprising:
a computer system comprising one or more physical processors programmed with computer program instructions to:
receive a natural language input of a user comprising a natural language utterance in which at least a first input token has been uttered;
provide the natural language input to a speech-to-text recognizer;
obtain one or more words of the natural language input as an output of the speech-to-text recognizer, wherein the one or more words includes the first input token;
obtain a semantic grammar that includes word combinations for intent processing and integrates a plurality of domain tokens relating to an information domain, wherein the semantic grammar integrates the plurality of domain tokens structured into a domain information Finite State Transducer (FST) parser that includes at least a first FST path comprising a first set of domain tokens and a second FST path comprising a second set of domain tokens;
compare the plurality of domain tokens with the first input token; and
generate a first score for the first FST path and a second score for the second FST path based on the comparison;
select the first FST path based on the first score and the second score;
determine a semantic structure of the one or more words based on the selected first FST path;
generate a representation of an intention of the user based on the semantic structure, wherein the representation is used to execute a natural language based search request or a natural language based command.

14. The system of claim 13, wherein the first score is based on a first sum of weights of each domain token among the first set of domain tokens and the second score is based on a second sum of weights of each domain token among the second set of domain tokens, and wherein a given weight for a domain token is based on a level of frequency that the domain token appears in the information domain.

15. The system of claim 14, wherein the computer system is further programmed to:
initialize an input FST based on the first token and the semantic structure; and
compose the input FST based on the first FST path and the second FST path, wherein the first FST path and the second FST path are integrated with the input FST, and wherein the first FST is selected from the input FST.

16. The system of claim 15, wherein to select the first FST path, the computer system is further programmed to:
select a shortest path in the input FST.

17. The system of claim 15, wherein to compare the plurality of domain tokens with the first input token, the computer system is further programmed to:
perform fuzzy or exact matching between the plurality of domain tokens from the information domain and the first token, wherein the plurality of domain tokens comprises fuzzy or exact matches to the first token.

18. The system of claim 13, wherein the computer system is further programmed to:
identify a second token that is relevant to the first token and the information domain, wherein the second token is not initially included in the natural language input; and
add the second token to the meaning representation.

19. The system of claim 13, wherein the natural language input comprises at least a second token, and wherein the computer system is further programmed to:
  determine that the second token is not relevant to the information domain; and
  omit the second token from the meaning representation responsive to the determination that the second token is not relevant.

20. The system of claim 13, wherein the computer system is further programmed to:
  obtain a phoneme confusion matrix comprising at least two similar sounding words that are disambiguated based on previous training from one or more user utterances; and
  disambiguate the first token based on the phoneme confusion matrix.

21. The system of claim 13, wherein the computer system is further programmed to:
  obtain one or more dynamic data tokens from a dynamic data source; and
  integrate the one or more dynamic data tokens with the plurality of tokens from the information domain, wherein the meaning representation is determined based on the integrated dynamic data tokens.

22. The system of claim 21, wherein the plurality of domain tokens are structured into a domain information FST parser that includes at least a first FST path comprising a first set of domain tokens and a second FST path comprising a second set of domain tokens, and wherein to integrate the one or more dynamic data tokens, the computer system is further programmed to:
  generate a dynamic FST based on the one or more dynamic data tokens; and
  insert the dynamic FST into a slot of the domain information FST parser reserved for dynamic data.

23. The system of claim 13, wherein the computer executable action comprises an execution of: a natural language-based search request or a natural language-based command.

24. The system of claim 13, wherein the information domain comprises a plurality of entries of searchable information, and wherein to retrieve the plurality of domain tokens that match the first token, the computer system is further programmed to:
  determine at least one entry, which includes the plurality of domain tokens, that is likely being searched for based on the first token.

25. The method of claim 1, wherein the first FST path is associated with a first action to be performed and the second FST path is associated with a second action to be performed, the method further comprising:
  recognizing an action to be performed based on one or more tokens of the one or more words, wherein the first FST path is selected based further on the recognized action to be performed and the first action to be performed.

* * * * *